US005956721A

United States Patent [19]
Douceur et al.

[11] Patent Number: 5,956,721
[45] Date of Patent: Sep. 21, 1999

[54] METHOD AND COMPUTER PROGRAM PRODUCT FOR CLASSIFYING NETWORK COMMUNICATION PACKETS PROCESSED IN A NETWORK STACK

[75] Inventors: John R. Douceur, Bellevue; Yoram Bernet, Seattle; Ofer Bar, Newcastle, all of Wash.

[73] Assignee: Microsoft Corporation, Redmond, Wash.

[21] Appl. No.: 08/933,868

[22] Filed: Sep. 19, 1997

[51] Int. Cl.$^6$ ................................................. G06F 17/30
[52] U.S. Cl. .............................................................. 707/10
[58] Field of Search ............................... 707/2, 3, 4, 5, 707/6, 10; 395/200.47, 200.48

[56] References Cited

U.S. PATENT DOCUMENTS

| | | | |
|---|---|---|---|
| 5,414,650 | 5/1995 | Hekhuis | 364/715.02 |
| 5,446,736 | 8/1995 | Gleeson et al. | 370/85.13 |
| 5,485,460 | 1/1996 | Schrier et al. | 370/94.1 |
| 5,627,829 | 5/1997 | Gleeson et al. | 370/230 |
| 5,761,424 | 6/1998 | Adams et al. | 395/200.47 |
| 5,787,430 | 7/1998 | Doeringer et al. | 707/100 |
| 5,802,307 | 9/1998 | Melo | 395/200.62 |
| 5,802,511 | 9/1998 | Kouchi et al. | 707/2 |
| 5,806,068 | 9/1998 | Shaw et al. | 707/103 |

OTHER PUBLICATIONS

Barr et al. "Network Monitoring System Design" SIGSCE 98, pp. 102–106, Jul. 1998.
Thekkath et al. "Implementing Network Protocols at User Level" IEEE/ACM Transactions on Networking, vol. 1, No. 5, pp. 554–565, Oct. 1993.
Baily, Mary L., Gopal, Burra, Pagels, Michael A., Peterson, Larry L., and Sarkar, Prasenjit, Usenix Assocation, *Pathfinder: A Pattern–Based Packet Classifier*, Department of Computer Science, University of Arizona, pp. 115–123.
Mogul, Jeffrey C., Rashid, Richard F., and Accetta, Michael J., *The Packet Filter: An Efficient Mechanism for User–Level Network Code*, 1987, pp. 39–51.
McCanne, Steven, and Jacobson, Van, 1993 Winter Usenix, *The BSD Packet Filter: A New Architecture for User–Level Packet Capture*, Jan. 25–29, San Diego, California, 1993, pp. 259–269.
Yuhara, Masanobu, Bershad, Brian N., Maeda, Chris, and Moss, J. Eliot B., 1994 Winter Usenix, *Efficient Packet Demultiplexing for Multiple Endpoints and Large Messages*, Jan. 17–21, 1994, San Francisco, California, pp. 153–165.
Doeringer, Willibald, Karjoth, Günter, IEEE/ACM Transactions on Networking, *Routing on Longest–Matching Prefixes*, vol. 4, No. 1, Feb. 1996, pp. 86–97.
Fredkin, "Trie Memory", *Communications of the ACM*, vol. 3, No. 9, Sep. 1960, pp. 490–499.

(List continued on next page.)

*Primary Examiner*—Paul V. Kulik
*Assistant Examiner*—Michael J. Wallace, Jr.
*Attorney, Agent, or Firm*—Workman, Nydegger, Seeley

[57] ABSTRACT

A method and computer program product for classifying network communication packets being processed in a network stack. The computer program product is a centralized packet classifier that receives classification requests from drivers or other clients according to a defined interface. This reduces the cost for producing a driver since less code is required initially at development time as well as a corresponding reduction in maintenance costs. The present invention groups drivers or other clients that utilize a certain body of classification information into classification families. Further, reference patterns used to make classifications are stored in separate databases depending on whether they are specific or general. There exists a single specific pattern database for all specific reference patterns regardless of classification family having a constant search time and a general pattern database for each general reference pattern for each classification family defined to the system whose search time may vary according to the amount of information contained therein. When servicing a classification request, the packet classifier will first search the specific pattern database followed by a search in the appropriate general pattern database if necessary.

20 Claims, 14 Drawing Sheets

OTHER PUBLICATIONS

Morrison, "PATRICIA–Practical Altgorithm to Retrieve Information Coded in Alphanumeric", *Journal of the Association for Computing Machinery,* vol. 15, No. 4, Oct. 1969, pp. 514–143.

Gonnet and Baeza–Yates, *Handbook of Algorithm and Data Structures,* Addison–Wesley, 1991, pp. 133–143.

Sedgewick, *Algorithms,* Addison–Wesley, 1988, pp. 245–257.

METHOD AND COMPUTER PROGRAM PRODUCT FOR CLASSIFYING NETWORK COMMUNICATION PACKETS PROCESSED IN A NETWORK STACK

BACKGROUND OF THE INVENTION

1. The Field of the Invention

The field of the present invention is the classification of network communication packets processed in a network stack. More particularly, the invention presents a generalized packet classifier that may be used to classify network communication packets from different software components, such as drivers, that each may have different purposes for making the classification.

2. Present State of the Art

Over time, the usefulness and benefits of stand-alone computing devices, such as the ubiquitous personal computer, have been leveraged by allowing many of such computing devices to communicate one with another over a communications network. Network communication between computers allows many different kinds of applications to exist that are otherwise not possible with a stand-alone computing device. One of the more common and useful applications is simple messaging that many people use in order to communicate by electronic mail, also known as email.

For communicating over a network, information that is to be transported from one computer to another is divided into a number of network communication packets. These network communication packets (also known simply as "packets") will eventually be transported across the physical communications network. In the PC environment, transmission is handled by a network interface card residing in the personal computer. Throughout this application, the PC environment will be assumed though the discussion and application of the concepts apply to many different network computing environments as will be appreciated by those skilled in the art.

The information originating at an application program running on a PC becomes packetized into network communication packets by passing through various software components before arriving at the network interface card for transmission on the physical communications network. The software components are typically layered drivers interconnected as appropriate to form what is known as the network stack.

Each driver or other processing component will process the data in succession as the original data is broken into successively different packetizing schemes from one level to the next down the network stack until the data is formed into packets that are transmitted by the network interface. The term "network communications packets" refer to any of the data packets used in the network protocol stack regardless of actual format. The original data is progressively packetized and formatted as it progresses down through the driver layers. For example, a TCP layer encapsulates the data in TCP packets, each of which may be further fragmented into multiple IP packets by an IP layer.

Typically, each driver has a particular function specified by a certain protocol or other constraint. For example, one driver may manage a network protocol such as the internet protocol (IP) while another may manage the actual network interface card. Such modularity allows a variety of different user configurations to be made without rewriting code. For example, the network protocol may be disassociated from any particular physical transmission system. In other words, by using interconnected drivers in the network stack, the same network protocol driver may be used with various physical interface drivers according to the particular physical configuration.

In order to send an email message from one computer to another, the text of the information is placed in a higher level protocol packet along with some packet header information and passed from the application into the network stack. Each element of the network stack may add additional header information and make processing decisions based on the information in the packet itself or any of the header information previously created by higher level drivers. Furthermore, packets at one level of the network stack may be broken down or recast into multiple packets at another level of the network stack. Eventually, all data will be packetized into packets suitable for transmission over the network interface.

Sending an email message may be viewed analogously to sending a letter by regular mail. The body of the message itself is created in both instances by the user. There are a number of processing steps for mailing a letter by regular mail before it is placed into the custody of the postal service (analogous to sending a packet over a communications network). An envelope must be procured, an address written on the envelope, and postage affixed to the envelope prior to placing the letter into the mail box. Each intermediate step may be thought of as header information (addressing, envelope, etc.) created by individual drivers processing an email message for delivery over a communications network between computers.

At the receiving end, packets are passed up the network stack. Each element of the network stack may remove a portion of the header information and make processing decisions based on the information in the packet itself or any of the header information not removed by lower level drivers. Furthermore, multiple packets at one level of the network stack may be combined into aggregate packets at another level of the network stack.

FIG. 1 shows an example of a network stack with an application program 20 at the highest level and a number of drivers at each successive level before reaching the network interface card 22, namely, driver A 24, driver B 26, driver C 28 and driver D 30. Each driver will perform processing in association with the packet before passing the packet on down to the next driver.

A packet is "classified" for certain processing in a given driver based on information about the packet that is contained in the headers or from information inside the data portion of the packet itself. Based on its classification, a packet will be processed by the driver differently and as shown in FIG. 1, a driver that needs to make a packet classification or make decisions based on information in the packet has a special portion of driver code called a packet classifier. In FIG. 1, driver A 24 will use packet classifier 32, driver C 28 will use packet classifier 34 and driver D 30 will use packet classifier 36. As mentioned previously, the packetization of the original data may be of a different format at each different driver. Note that driver B 26 will process packets in such a way that no packet classification is needed.

Each driver will perform different kinds of classification depending on the driver's purpose. In order to better appreciate the different classification scenarios, a number of different types of classification of network communication packets are now provided. The simplest form of classification involves comparing a certain value of a packet with a specific value. The classification being based upon matching a particular value as shown in the example of Table 1 below.

TABLE 1

| Classification | Destination Address |
|---|---|
| 0 | 11.22.33.44 |
| 1 | 11.22.55.66 |
| 2 | 11.22.77.88 |
| 3 | 11.23.34.45 |
| 4 | 11.23.45.67 |
| 5 | 12.34.56.78 |

Table 1 illustrates six different possible classifications for a packet based on a packet's exactly matching one of the destination addresses listed in the table. For example, a packet will be classified as belonging to classification 0 if and only if its destination address is "11.22.33.44". Similarly, an exact match of the destination address field for a particular packet to be classified is necessary for each of the other five classifications.

Another form of classification that becomes slightly more complex involves comparing two or more fields from a packet to be classified with specific reference values that all must be matched in order to achieve a classification. This is shown below in the example of Table 2.

TABLE 2

| Classification | Destination Address | Destination Port |
|---|---|---|
| 0 | 11.22.33.44 | 1 |
| 1 | 11.22.33.44 | 2 |
| 2 | 11.22.33.44 | 3 |
| 3 | 11.22.55.66 | 1 |
| 4 | 11.22.55.66 | 2 |
| 5 | 11.22.55.66 | 3 |

Table 2 illustrates six different multiple-field classifications having a value for the destination address and the destination port. For example, a packet will be classified as belonging to classification 0 if and only if both its destination address is "11.22.33.44" and its destination port is "1". In like manner, in order for a packet to be classified according to the other classifications shown in Table 2, exact matches of both the destination address field and the destination port field as found in the network packet must match corresponding entries exactly for each of the other five classifications.

In Table 3 below, wildcards (as represented by an 'x') are introduced into the reference specification to illustrate a more complex form of classification. The values in the table having wildcards may match more than one value.

TABLE 3

| Classification | Destination Address | Destination Port |
|---|---|---|
| 0 | 11.22.33.44 | 1 |
| 1 | 11.22.33.44 | 2 |
| 2 | 11.22.55.66 | X |
| 3 | 11.22.77.XX | 1 |
| 4 | 11.23.XX.XX | 2 |
| 5 | 11.24.45.XX | X |

Of the six classifications shown in Table 3, those with a wildcard value may match more than one value or set of values from a packet to be classified. In other words different values found in different packets may still receive the same classification. Classifications 0 and 1, on the other hand, contain no wildcards and thus are exact reference specifications, just like those found in Table 2 requiring an identical match in order for a classification to occur. However, classification 2 will be matched by all packets having a destination address value of "11.22.55.66" irrespective of the value of the destination port filed in the packet. Similarly, classification 3 will be met for all network packets whose destination address begins with "11.22.77" and have a destination port field value of "1".

Essentially, wildcards allow a shorthand representation of a set of specific classifications and can be used advantageously in situations where all of the processing associated with a group of specific classifications is the same. Such a classification containing wildcards or otherwise allowing different values that will result in a match can be referred to as general classification.

Because general classifications cover multiple different values, there exists the potential for overlapping classifications. In other words, a given network packet may be legitimately classified in more than one classification. Such overlapping classifications occur in two varieties: (1) a subsuming or hierarchical overlap where each and every value of one classification will be contained in another more general classification, and (2) partial overlap where one classification will share some, but not all, values with another classification. In a subsuming overlap, a packet that matches the more specific classification will by definition match the more general classification while in a partial overlap a given packet may or may not fit into both classifications depending on the actual values of the relevant packet fields.

Since classification generally requires that a single best classification category be returned, rules and other criteria must be implemented to return a single classification when an overlap condition results. It is often the case that, when a packet matches multiple classifications, the best match is considered to be that which is most specific. Therefore, in the case of a subsuming overlap, the most specific classification would generally be used.

In a partial overlap, a winning classification must be selected based on other criteria since neither classification is more specific than the other. One example criterion is an explicit and distinct priority attribute associated with each classification that has a partial overlap condition. Such a criterion could be used to arbitrate between the overlapping classifications so that a best match may be made in each instance.

Below, in Table 4, examples of subsuming overlapping and partial overlapping classifications are shown.

TABLE 4

| Classification | Destination Address | Destination Port | Priority |
|---|---|---|---|
| 0 | 11.22.33.44 | 1 | 0 |
| 1 | 11.22.33.44 | X | 0 |
| 2 | 11.22.55.66 | 1 | 0 |
| 3 | 11.22.55.XX | 1 | 0 |
| 4 | 11.22.XX.XX | 2 | 1 |
| 5 | 11.22.55.XX | X | 0 |

Table 4 specifies six classifications, some general and some specific. A packet with a destination address of "11.22.33.44" and a destination port of "1 " will match both classification 0 and classification 1. Since classification 0 and classification 1 are subsuming overlapping classifications, according to the general rule the best match would be the most specific classification which in this case would be classification 0.

A packet having a destination address of "11.22.55.66" and a destination port of "2" will match both classification 4 and classification 5. This is a partial overlap situation since neither classification 4 nor classification 5 is more specific than the other and resort to the priority information associated with the overlapping classifications is made in order to find the best match. Since classification 4 is shown to have a lower priority than classification 5, the best match would be classification 5.

In order to simplify the process of classification, certain terms are used throughout this application. A "pattern" is all the classification criteria concatenated together in a certain order. For example, a reference pattern would be the concatenation of the destination address and the destination port as found in Table 4 for each classification. In other words, Table 4 would contain six reference patterns that may be matched by a corresponding classification pattern created by the actual values of the fields in a network communication packet. Again, a classification pattern is created by placing actual values taken from the packet into the prescribed order so that it may be compared with a number of reference patterns in order to arrive a particular classification should a match occur.

Generally, packet classifiers are developed independently in each driver as part of the driver code development. Because packet classification is similar for all drivers in many respects, this represents a duplication of effort and added complexity in driver code development. This inefficiency exhibits itself in the form of the extra lime taken for the packet classification code development as well as the added time for debugging and maintaining the extra code.

Another problem is the repeated classifications that must occur by each driver for the same packet during run time. Since each driver may perform the same classification for each packet as it passes it up or down the protocol stack, redundant processing commonly results.

What is needed is a centralized packet classifier that is accessible by all drivers, or other clients, and that can be used by each individual driver according to the specific purposes of the particular driver. A generalized and centralized packet classifier will reduce code development for drivers requiring packet classification and further allows features added to the centralized packet classifier to be immediately available by driver developers.

Two main problems exhibit themselves and must be solved for a centralized packet classifier to have any meaningful acceptance by driver developers. First, performance for the actual classification for the generalized and centralized packet classifier must be adequate so that the driver may accomplish its purpose within adequate time criteria. A centralized packet classifier that is used by many drivers will tend to have a larger database of potential classifications or reference patterns than an individualized classifier for a single driver, and the larger reference pattern database may impact the efficiency of classification.

Another problem associated with a generalized and centralized packet classifier is that may not be flexible enough to meet the customized needs of a particular driver. When making individualized packet classifiers as part of driver development, the driver developer may customize and tune the driver code for optimum performance and applicability to the desired purpose. In order to provide a clean interface to all drivers or clients to the classification services, a centralized packet classifier may not be adequately flexible for all drivers.

What is needed is a generalized and centralized packet classifier that may provide classification services to drivers or other clients in a manner that provides enough flexibility for clients with different needs and purposes to benefit therefrom on a functional basis. Furthermore, such a centralized packet classifier must of necessity have adequate performance characteristics and in many instances must be comparable in performance to classification that may be achieved by an individualized packet classifier.

SUMMARY AND OBJECTS OF THE INVENTION

It is an object of the present invention to reduce software driver code development and maintenance expense by providing a centralized network packet classifier that can be used by all drivers in a network stack.

It is a further object of the present invention to institute classification families of related drivers or other clients that share a particular body of classification information and to use multiple reference pattern databases in order to achieve performance enhancement.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, a method and computer program product for classifying network communication packets processed in a network stack is provided.

The present invention is directed to a method for classifying packets during the processing of packetized network data where processing occurs over successive layered drivers in a network stack. A packet is "classified" for different kinds of processing based on certain values in the packet that are collectively known as a classification pattern.

The present invention is a generalized and centralized packet classifying service or packet classifier that serves multiple drivers or other clients and simplifies development of packet classification code for each driver. After registration of one or more reference patterns along with corresponding classification information that may be used to process a packet, any driver may present a classification pattern that can be matched with the stored reference patterns and receive access the corresponding classification information when a match occurs. Having a centralized packet classifier translates into savings in driver development time, debugging time, and general code maintenance. Furthermore, any new features added to the packet classifier can then be used by all drivers or other clients to the service.

The present invention overcomes the performance limitations associated with centralizing and generalizing packet classification by segregating reference patterns into two different types of databases and grouping reference patterns into classification families. A classification family is a group of drivers or other clients that share a set of packet classification information.

General reference patterns that may match more than one classification pattern are stored into a general pattern database whose search time may vary according to the amount and type of data stored. In order to reduce search time, there exists a general pattern database for each classification family.

Specific reference patterns for all classification families are stored in a specific pattern database, such as a hash table, that has a constant search time regardless of the number of specific reference patterns contained therein. When servicing a classification request, the centralized packet classifier will search the specific pattern database first before searching the general pattern database for the classification family. This arrangement compares favorably performance wise with customized classification code.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
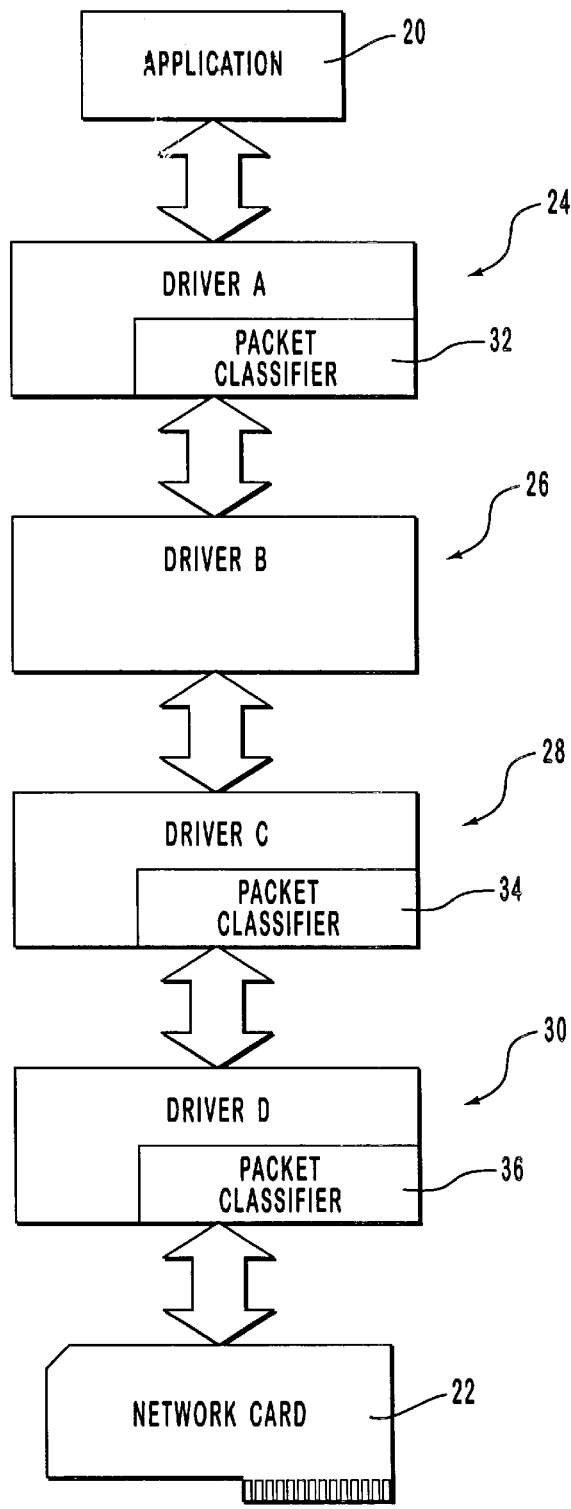
FIG. 1 is a block diagram illustrating a network stack of interconnected drivers for processing network communications packets having individual packet classifiers in the respective drivers as is common in the prior art.

As used herein, the term "software component" refers to any set of executable instructions separately cognisable to an operating system that manages a computer system. Examples would include separate processes or threads, application programs, system device drivers, and any other such operating system entity.

As used herein, the term "driver" refers to software driver programs running in a privileged system environment and that interacts with an I/O subsystem as part of an operating system architecture. Such a driver is distinguishable from an application program and other software.

As used herein, the term "client" refers to any portion of code that may use the centralized packet classifier of the present invention disclosed herein. Because a single software component, such as a driver, may have multiple classification needs, it may be viewed as multiple clients as seen by the centralized packet classifier. In other words, the centralized packet classifier does not necessarily distinguish the origin of classification requests. It is simply a means for classifying network communications packets.

As used herein, the term "pattern" refers to specific or general values of the fields found in a packet or packet header that are concatenated together in a certain order and considered a set or series of bits.

A "reference pattern" is a pattern having associated therewith certain classification information that can be used by a particular driver or software component and is held in a database by the centralized packet classifier. A "specific reference pattern" is a reference pattern having specific values for each and every value therein. A "general reference pattern" is a reference pattern having one or more wildcards contained therein that may have any value such that different patterns may match the general reference pattern. In this manner, a general reference pattern can be viewed as a short-hand way of specifying a group or set of specific reference patterns.

A "classification pattern" is a pattern presented to the generalized packet classifier by a driver or other client and is made from actual values of a packet to be classified. If the classification pattern is matched with a reference pattern (either specific or general) then access is returned to the driver to classification information associated with the matched reference pattern that can be used by the driver to process the packet according to its classification.

As used herein, the term "classification information" refers to any relevant information associated with a reference pattern. Examples of such classification information include a simple numeric indication of classification, a block of data that may be used to perform further processing, or any other information useful to a driver in processing.

As used herein, the term "classification family" refers to a logically related set of reference patterns shared by multiple drivers. This allows a set of drivers or other clients to share a database of related classification information. As used herein, each reference pattern has a classification family associated therewith such that different classification information may be used with the exact same reference pattern based on classification family.

As used herein, the term "classification block" refers to a block of data associated with a specific reference pattern that can be used to access the classification information for all classification families installed for that specific reference pattern. One implementation of a classification block disclosed herein is a list of pointers that can be indexed by the classification family.

As used herein, the term "classification handle" is a reference Lo all the different classification information associated with a given specific reference pattern. In other words, using the classification handle with a particular classification family will allow a driver to arrive at the classification information for a given specific reference pattern and classification family. For example, one implementation of a classification handle is a pointer to a classification block. The classification handle is useful in that, if the specific reference pattern is already attained and known, then only the classification family need be used with the classification handle in order to arrive at desired classification information.

Figure 2:
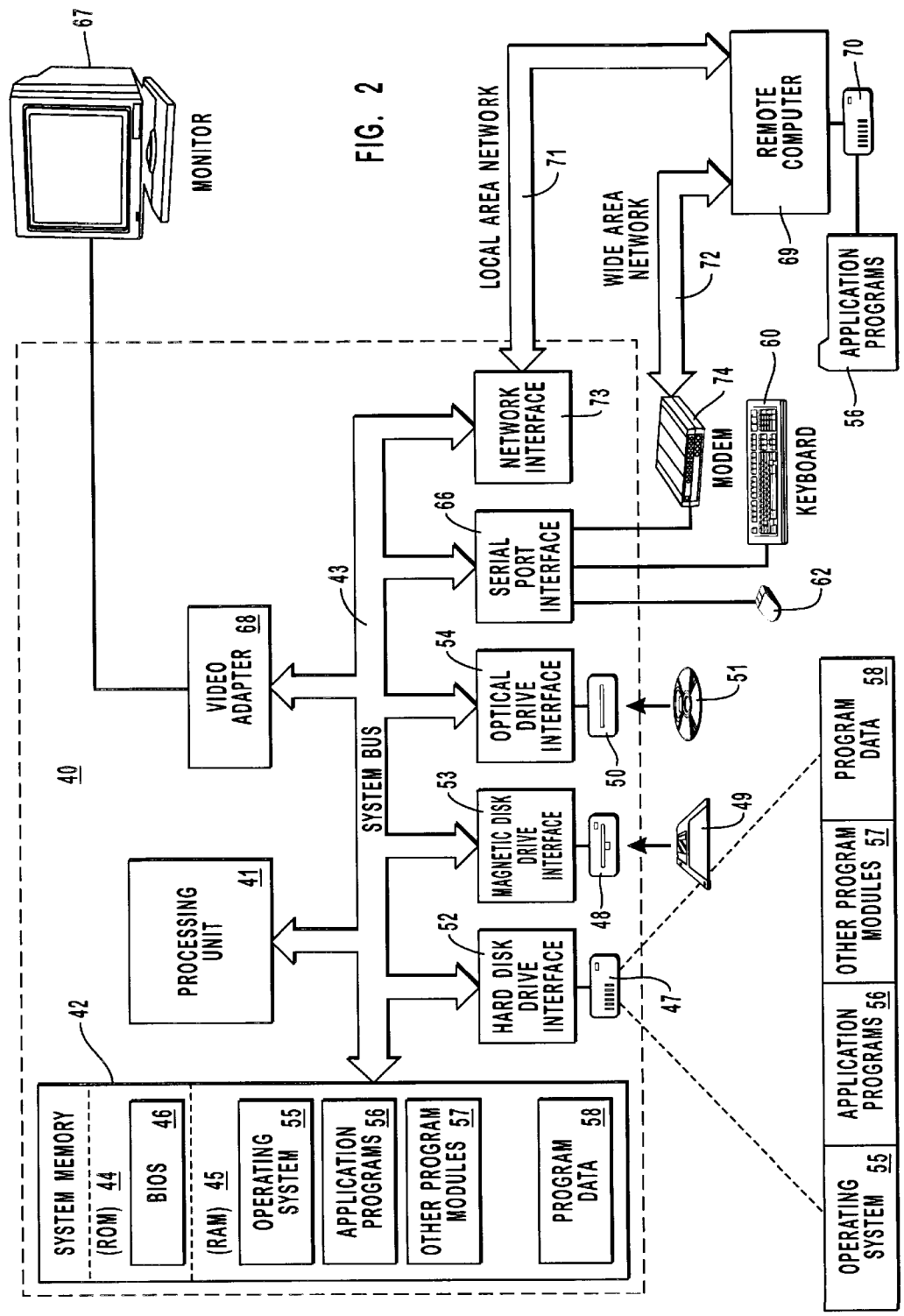
FIG. 2 is a block diagram of an exemplary system for implementing the invention that includes a general purpose computing device in the form of a conventional personal computer.

FIG. 2 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing the invention includes a general purpose computing device in the form of a conventional personal computer 40, including a processing unit 41, a system memory 42, and a system bus 43 that couples various system components including the system memory to the processing unit 41. The system bus 43 may be any of several types of bus structures including a memory bus or memory controller, a peripheral bus, and a local bus using any of a variety of bus architectures. The system memory includes read only memory (ROM) 44 and random access memory (RAM) 45. A basic input/output system 46 (BIOS), containing the basic routines that helps to transfer information between elements within the personal computer 40, such as during start-up, is stored in ROM 44. The personal computer 40 further includes a hard disk drive 47 for reading from and writing to a hard disk, not shown, a magnetic disk drive 48 for reading from or writing to a removable magnetic disk 49, and an optical disk drive 50 for reading from or writing to removable optical disk 51 such as a CD ROM or other optical media. The hard disk drive 47, magnetic disk drive 48, and optical disk drive 50 are connected to the system bus 43 by a hard disk drive interface 52, a magnetic disk drive-interface 53, and an optical drive interface 54, respectively. The drives and their associated computer-readable media provide non-volatile storage of computer readable instructions, data structures, program modules and other data for the personal computer 40. Although the exemplary environment described herein employs a hard disk, a removable magnetic disk 49 and a removable optical disk 51, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 49, optical disk 51, ROM 44 or RAM 45, including an operating system 55, one or more application programs 56, other program modules 57, and program data 58. A user may enter commands and information into the personal computer 40 through input devices such as a keyboard 60 and pointing device 62. Other input devices (not shown) may include a microphone, joystick, game pad, satellite dish, scanner, or the like. These and other input devices are often connected to the processing unit 41 through a serial port interface 66 that is coupled to the system bus, but may be connected by other interfaces, such as a parallel port, game port or a universal serial bus (USB). A monitor 67 or other type of display device is also connected to the system bus 43 via an interface, such as a video adapter 68. In addition to the monitor, personal computers typically include other peripheral output devices (not shown), such as speakers and printers.

The personal computer 40 may operate in a networked environment using logical connections to one or more remote computers, such as a remote computer 69. The remote computer 69 may be another personal computer, a server, a router, a network PC, a peer device or other common network node, and typically includes many or all of the elements described above relative to the personal computer 40, although only a memory storage device 70 has been illustrated in FIG. 2. The logical connections depicted in FIG. 2 include a local area network (LAN) 71 and a wide area network (WAN) 72. Such networking environments are commonplace in offices enterprise-wide computer networks, intranets and the Internet.

When used in a LAN networking environment, the personal computer 40 is connected to the local network 71 through a network or adapter 73. When used in a WAN networking environment, the personal computer 40 typically includes a modem 74 or other means for establishing communications over the wide area network 72, such as the Internet. The modem 74, which may be internal or external, is connected to the system bus 43 via the serial port interface 66. In a networked environment, program modules depicted relative to the personal computer 40, or portions thereof, may be stored in the remote memory storage device. It will be appreciated that the network connections shown are exemplary and other means of establishing a communications link between the computers may be used.

Figure 3:
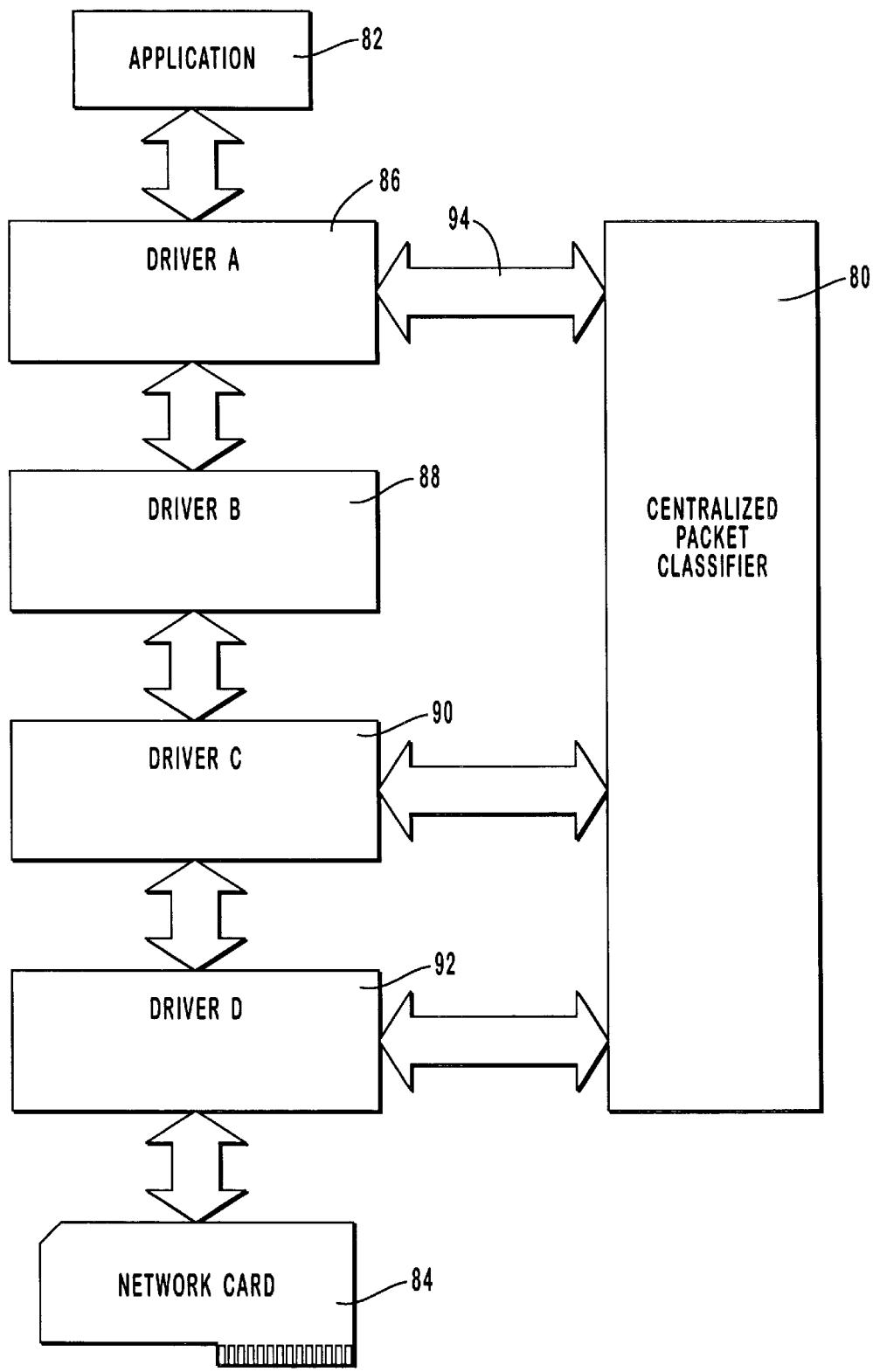
FIG. 3 is a block diagram showing a network stack of interconnected drivers that uses a centralized packet classifier for the drivers that need packet classification according to the present invention and corresponding to the same drivers shown in FIG. 1.

Referring now to FIG. 3, a logical diagram illustrating the interaction between the centralized packet classifier 80 and various drivers in the network stack is shown that is similar to FIG. 1. The centralized packet classifier 80 is used as a means for classifying the network communication packets processed by the drivers of the network stack. Again, an application program 82 wishes to send data over the network through a network interface card 84 and will pass that information through a plurality of stacked drivers to be processed in succession. The information will initially pass from the application 82 to driver A 86, then to driver B 88, then to driver C 90, and then, finally, to driver 92 before being sent out over the communications network under the control of the network interface card 84.

Each driver that needs classification services for the network communication packets during processing may use the centralized packet classifier 80 to perform the classification. As shown in FIG. 3, driver A 86 uses the centralized packet classifier as shown by the arrow 94. In like manner, driver C 90 and driver D 92 uses the centralized packet classifier 80. Note that driver B 88 does not use the centralized packet classifier though it may do internal packet classification.

In order to prevent the potentially large size of the reference database from decreasing the efficiency of the classification process, two main techniques are employed in the centralized packet classifier of the present invention. First, patterns are segregated into different databases depending on whether they are specific reference patterns or general reference patterns. There exists a single specific reference pattern database ("specific database") for all classification families and a general reference pattern database ("general database") for each classification family. By having a separate general database for each classification family, one classification family's database size will not affect the classification for another classification family when searching the general reference patterns for matches to presented classification patterns. Second, all specific reference patterns in the specific pattern database are stored in a data structure that can be searched in constant time therefore rendering the database size irrelevant to the actual search time. A pattern that is stored in the database is said to also be installed into the database or into the system of the present invention.

From each installed general reference pattern is a pointer to the appropriate classification information according to the classification family and general database pertaining to the particular general pattern. From each installed specific reference pattern are multiple pointers to the appropriate classification information, one for each classification family having a matching pattern installed in the specific database.

Figure 4:
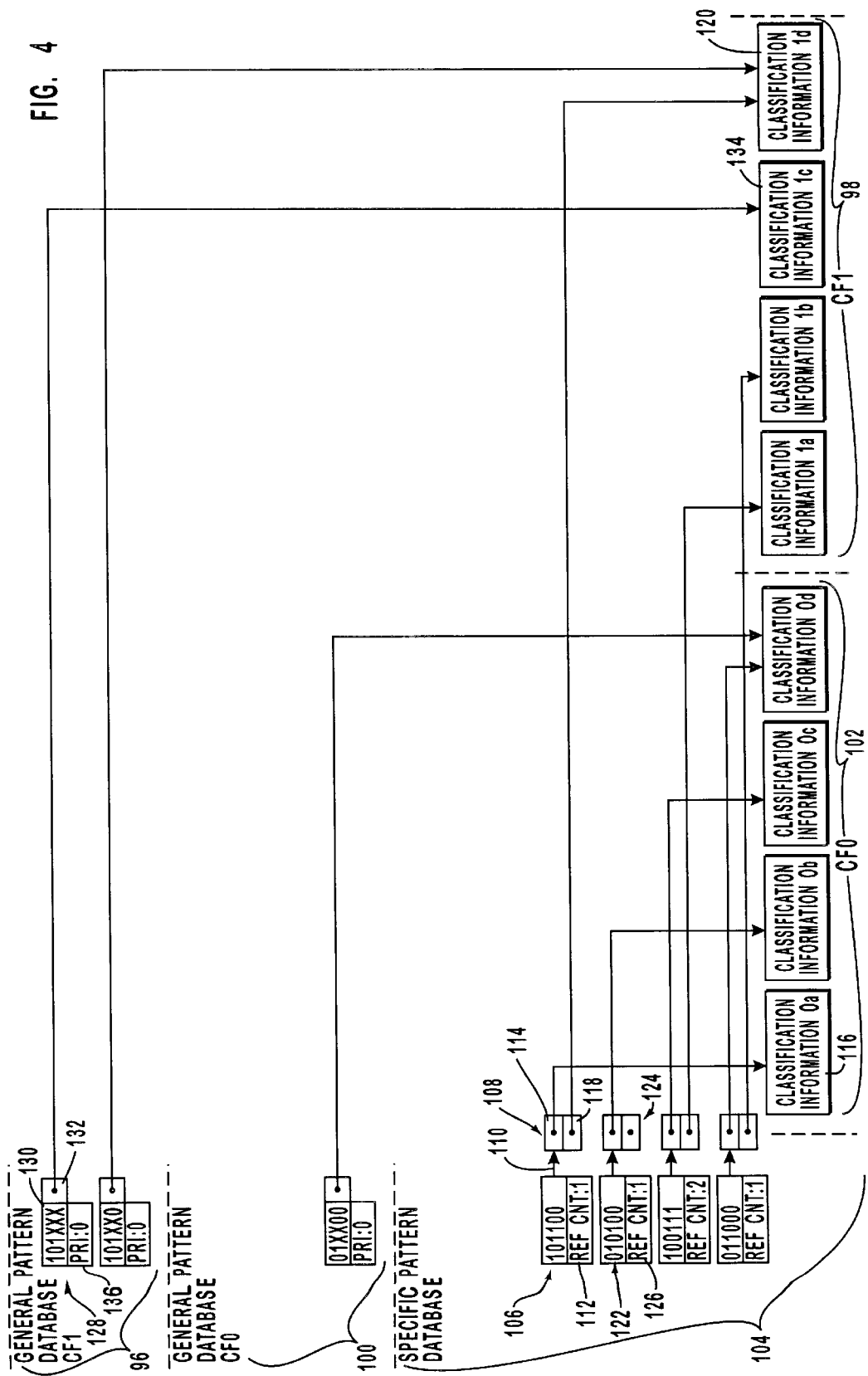
FIG. 4 is a logical diagram showing the database arrangement of a centralized packet classifier according to the present invention. Namely, the existence of a specific database wherein each specific reference pattern entry indicates the appropriate classification information according to classification family and a general database for each classification family that contains general reference pattern entries and pointers to corresponding classification information. In this example there are two classification families.

Referring now to FIG. 4, a logical diagram of an example classification system having two classification families and used in a packet classifier according to the present invention is illustrated. Table 5 below illustrates the information contained in the classification system shown in FIG. 4.

TABLE 5

| Classification Family | Reference Pattern | Classification Information |
|---|---|---|
| 0 | 101100 | 0a |
| 0 | 010100 | 0b |
| 0 | 100111 | 0c |
| 0 | 01XX00 | 0d |
| 1 | 100111 | 1a |
| 1 | 011000 | 1b |
| 1 | 101XXX | 1c |
| 1 | 101XX0 | 1d |

Referring to FIG. 4, a general pattern database or general database 96 for classification family 1 will have entries that point to the classification family information for classification family 1, a general database 100 for classification family 0 will point to the classification family information 102 for classification family 0, and a specific pattern database or specific database 104 will have entries that point to both classification family information 98 for classification family 1 and classification information 102 for classification family 0.

Referring now to specific database 104, an example entry 106 for specific reference pattern "101100" is examined in more detail. Besides the actual specific reference pattern, the entry 106 will point to a classification block 108 as represented by arrow 110 and have contained therein a reference count field 112. Reference count field will indicate the number of classification families that have the specific reference pattern for this entry (e.g., "101100" for this entry) explicitly installed therein.

A specific pattern is explicitly installed for a classification family when installed by a client or when automatically installed as a result of a client search. Both of these procedures will be explained hereafter. A specific pattern is implicitly installed when a classification block is updated as a performance enhancement resulting from the installation of a general pattern. This process will also be shown hereafter. An implicit installation will not cause the reference count field to be incremented.

In the example entry 106, there are two installations of the particular specific reference pattern, an explicit installation for classification family 0 and an implicit installation for classification family 1; thus, its reference count field 112 has a value of 1. Classification block 108 contains pointers to the particular classification information depending on classification family. For example, pointer 114 points to classification information 0a 116 while pointer 118 points classification information 1d 120. Note that entry 122 for pattern "010100" has only one pointer in the classification block 124 and a reference count field 126 value of 1. When a particular specific reference pattern is not installed for a particular classification family, the classification block will contain a no value for that pointer. The reference count of the entry only indicates the number of explicitly installed instances of the particular specific reference pattern (i.e., those having classification information associated therewith by a client installation or automatically installed as a result of a client search). Implicit installations may exist but will not be reflected by the reference count.

In order to have a constant search time, the structure of the specific database must be carefully chosen. The present invention contains a hash table for this purpose, specifically, an incrementally sizable hash table as disclosed in U.S. patent application Ser. No. 08/911,105 filed on Aug. 12, 1997 entitled Hash Table Expansion and Contraction for Use with Internal Searching, that is hereby incorporated by reference.

In addition to being stored in a hash table, each specific reference pattern is also stored in a Patricia tree, a structure commonly known in the art. The Patricia tree allows the specific pattern database to be quickly searched for all specific reference patterns that match a given general reference pattern. This is a necessary utility operation that is performed in connection with the installation and removal of reference patterns that will be explained in more detail hereafter.

Since the general reference patterns contain wildcards and are thus not simply values like the specific reference patterns, they cannot be stored in conventional constant search time data structures. One data structure that accommodates the storage of general reference patterns and supports subsuming overlapping patterns, (i.e., a match will be found for the most specific of the hierarchically related and subsuming overlapping patterns) is the Rhizome data structure as described in patent application Ser. No. 08/933,476 entitled Technique for Efficiently Classifying Packets using a Trie-Indexed Hierarchy Forest that Accomates Wildcards filed on Sep. 18, 1997, which is hereby incorporated by reference.

For partial overlapping general reference patterns, priority information is necessary to determine the actual best matching pattern during a search. This is implemented by using an array of Rhizome data structures, one for each priority level, and conducting a search in the Rhizome at the highest priority level followed by searches of the Rhizome at each successive priority level until a match is found or all priority level Rhizomes have been exhausted in the array. Those skilled in the art will note that other ways and means may be used to implement the actual general reference pattern database that will result in the most specific general reference pattern being returned as a match in the case of a subsuming overlapping general reference patterns or the higher priority general reference pattern to be returned on a search in the case of a partial overlapping general patterns.

Note that entry 128 as shown contains an actual reference pattern 130 having a value of "101XXX," a pointer 132 that indicates classification information 1c 134, and a priority field 136 having a value of zero. Those skilled in the art will recognize that if a classification family is not expected to have non-hierarchical or partial overlapping general patterns, then embodiments of the present invention will not need priority information to distinguish partial overlapping general reference patterns.

In order to perform a search on the reference pattern system as divided into specific and general databases shown herewith in FIG. 4, searches will be made on the specific database, followed by a search in the general database for the particular classification family until a match is found. This process will be described in more detail in connection with FIG. 9 hereafter.

Figure 7:
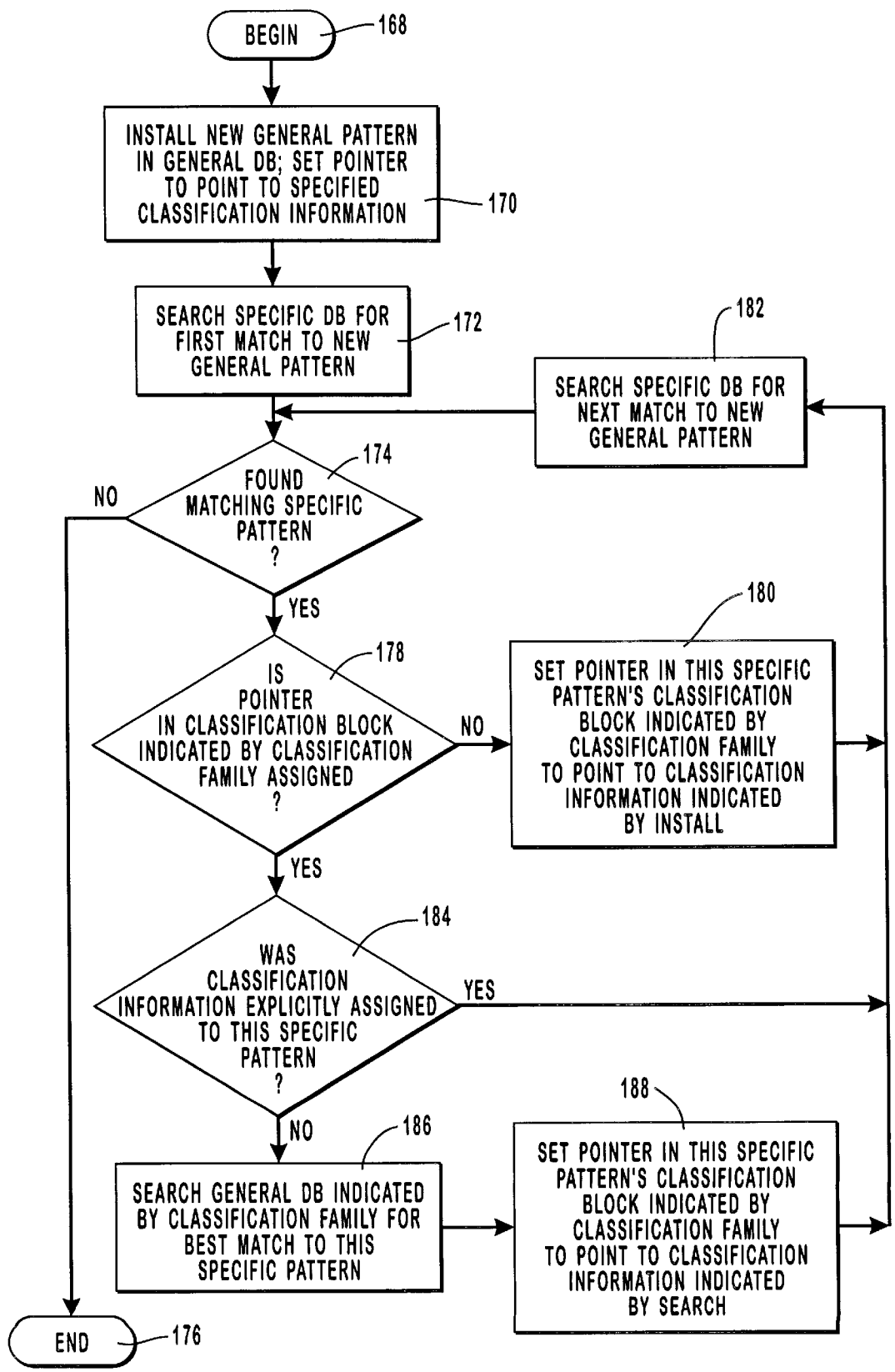
FIG. 7 is a flow chart illustrating the processing steps necessary for installing a general reference pattern into the general database that pertains to a particular classification family.

When a driver or other client installs a reference pattern, the centralized packet classifier first determines whether the reference pattern is specific or general by checking for wildcards within the reference pattern. If the reference pattern contains no wildcards, then it is specific, so the processing steps of the flow chart shown in FIG. 5 are taken, whereas processing steps of the flow chart shown in FIG. 7 are taken for reference patterns containing wildcards, since they are general.

Figure 5:
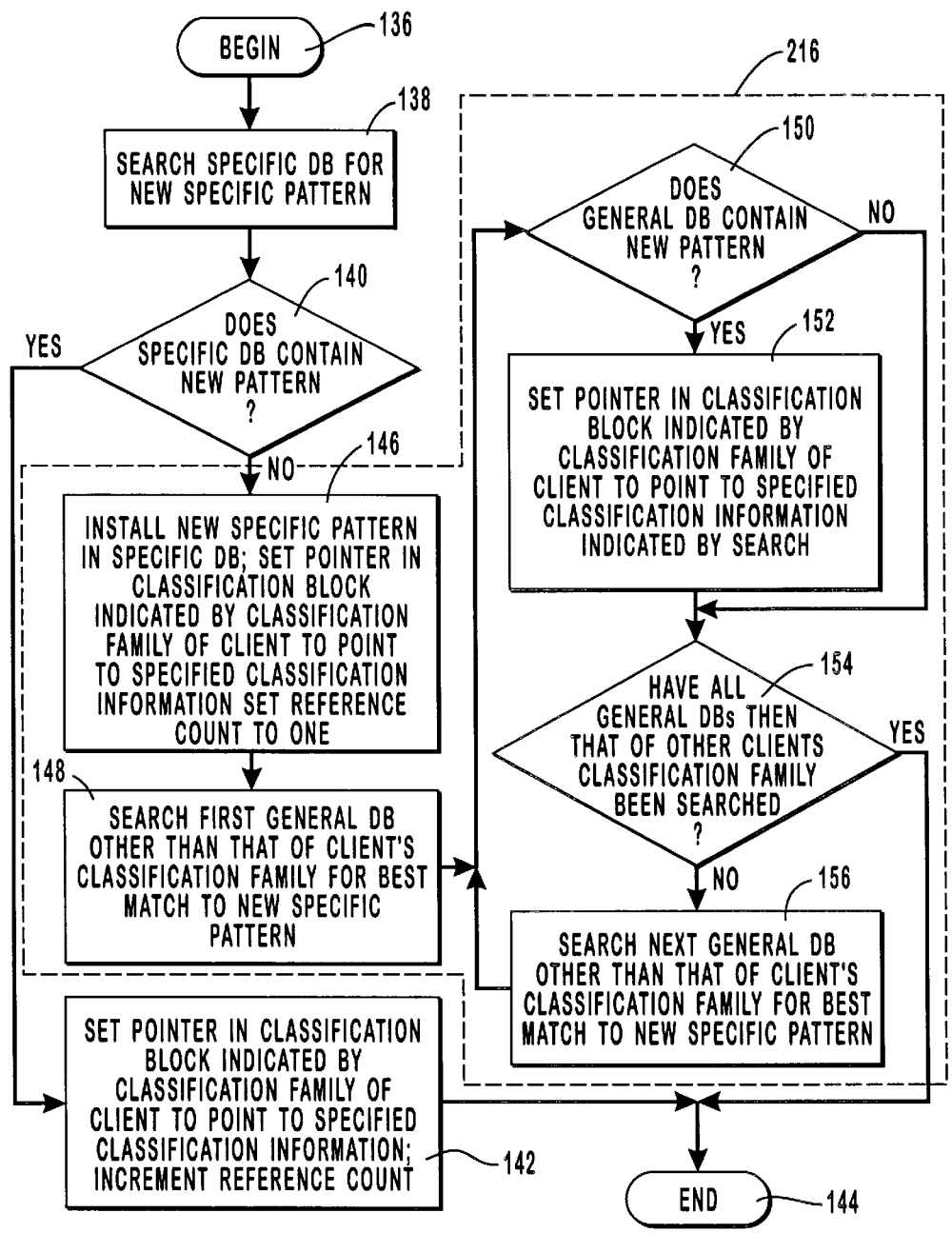
FIG. 5 is a flow chart showing the processing steps for installing a new specific pattern for a given classification family into the specific database.

Referring now to FIG. 5, the processing steps for installing a specific reference pattern into the specific database are shown. When presenting a reference pattern for installation, a driver or other client will present the reference pattern, the associated classification information, the classification family, and in the case of general reference pattern priority information. After beginning at step 136, the specific database is searched for the new specific reference pattern given to the centralized packet classifier from the driver or other client at step 138. As mentioned previously, this search can be done relatively quickly in constant time because the specific database uses a hash table or other constant search time structure.

At step 140, a determination is made whether the specific database already contains the new specific reference pattern in one of its entries. If so, at step 142, the classification block is accessed and the pointer therein pertinent to the classification family for the new specific reference pattern is set to point to the specified classification information. Additionally, the reference count field will also be incremented at step 142 since this installation is explicit by the client. Finally, processing will end at step 144 and the pattern will be installed. Note that this scenario, comprising step 142, occurs for those specific reference patterns that have been installed previously for another classification family so that the specific database entry structure is already created and in place and need only be modified as explained in step 142 to perform the installation.

If, at step 140, it is determined that the specific database does not contain the new pattern, the data entry must be created and initialized for a new specific pattern at step 146. This process entails installing the new specific pattern in the specific database, creating the classification block and setting the pointer indicated by the classification family presented by the client to point to the specified classification information, and setting the reference count to one for the entry since this is an explicit installation by a client.

Now that the new specific pattern exists for one classification family, all the general databases for the classification families other than the client's classification family are searched for general reference patterns that are matched by the new specific reference pattern. If a match occurs, the specific database may be set up so that matches for other classification families will be found during a specific database search thereby increasing the efficiency and lessening classification time. The first of these general databases is searched at step 148 for the best match to the new specific pattern.

At step 150, a determination is made as to whether a particular general database contains the new pattern. If so, the classification block is adjusted to include a reference to the specified classification information found from the general database search at step 152. This process includes setting the pointer in the classification block indicated by the classification family of the general database to point to the corresponding classification information. Note that the reference count for the specific database entry pertaining to the new specific reference pattern is not incremented since this would be an implicit installation due to performance enhancement based on general database matches to the newly installed pattern for other classification families than the one explicitly installing the specific pattern.

If the general database does not contain the new specific reference pattern, determination is made at step 154 as to whether all relevant general databases have been searched. If so, processing ends at step 144 otherwise, the next general database is searched for the best match to the new specific pattern at step 156. In this manner, all general databases other than the one for the classification family of the new specific reference pattern are searched for the best match to the new specific reference installed. For each match that occurs, the specific database will install the new reference pattern for that classification family and automatically get the classification information from the search of the corresponding general database.

Figure 6:
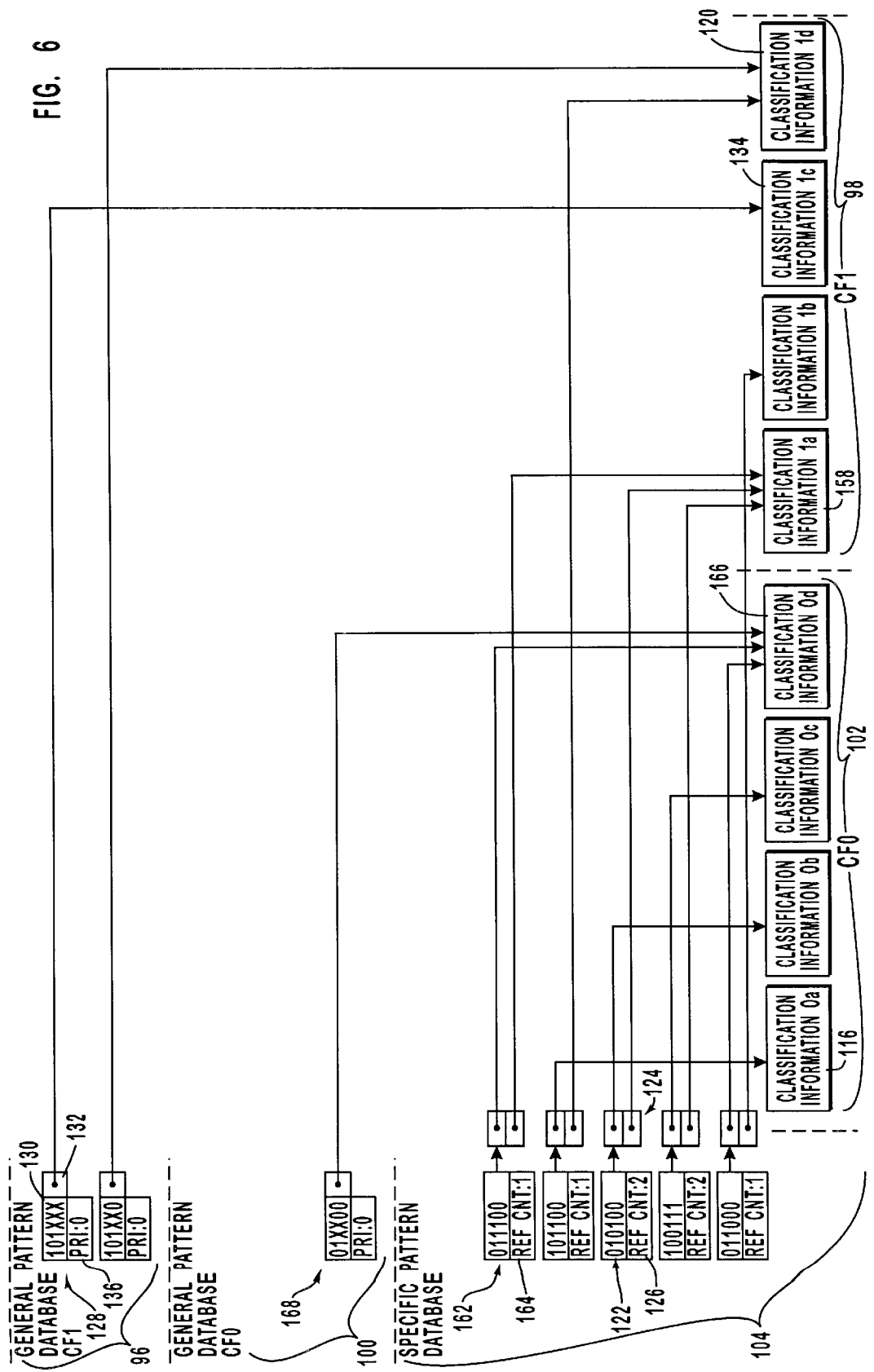
FIG. 6 is a logical diagram showing the database organization and example of FIG. 4 after a number of new specific reference patterns have been installed into the system according to the processing steps explained in the flow chart of FIG. 5.

To illustrate how specific reference patterns are installed, two patterns will be added to the logical diagram shown in FIG. 4. Namely, the specific reference pattern "010100" will be added for classification family 1 and the specific reference pattern "011100" will be added for classification family 1. FIG. 6 will show the logical diagram of FIG. 4 after the two specific reference patterns have been added.

To add the specific reference pattern "010100" for classification family 1 with classification information 1a 158 associated therewith, the processing steps of the flow chart of FIG. 5 are taken, and it will be determined at step 140 that the specific database already contains an entry 122 for the new specific reference pattern as can be seen in FIG. 4. Therefore, processing will proceed to step 142 where the pointer in the classification block is changed from null to indicate classification information 1a 158 and the reference count field 126 for the entry 122 is incremented from 1 to 2 as can be seen in FIG. 6 since this is an explicit client installation. Note that a new entry was not created and that such an installation will occur more quickly then one requiring the creation of a new entry into the specific database.

To install the specific reference pattern "011100" for classification family 1 and having classification information 1a 158 associated therewith, a new entry 162 is made as can be seen in FIG. 6. This occurs during the processing steps taken in the flow chart of FIG. 5 when it is determined at step 140 that the new specific reference pattern does not exist in an existing entry of the specific database thereby requiring the processing of step 146 to be taken. These steps will create the new entry having the pointer in the classification block pointing to classification information 1a 158 and the reference count field 164 initially set at 1 since this is an explicit client installation.

As the algorithm searches all the general databases for the other classification families, a match will be found for the specific reference pattern in the general database 100 for classification family 0. When the general database 100 for a classification 0 is searched, the general reference pattern found therein indicated by entry 168 will point to classification information 0d 166. A pointer is now made in the classification block for the specific database 104 for entry 162 pertaining to classification family 0 to point to classification information 0d 166 found during the previous search. Thereafter, any classification that occurs having this specific reference pattern for classification family 0 will be met by a search in the specific database 104 rather than resorting to an extra search in the general pattern database 100 for classification family 0.

At this point, FIG. 6 shows the classification system example of FIG. 4 with the addition of specific reference pattern "010100" for classification family 1 and specific reference pattern "011100" for classification family 1. Incident to the installation of the specific reference pattern "011100" for classification family 1, the same reference pattern was found for classification family 0 by virtue of the general reference pattern found in the general reference database 100 and a corresponding specific reference pattern was installed for classification family 0 in order to provide increased efficiency. Note that in de-installation of specific reference patterns shown hereinafter in FIG. 1, the specific reference pattern "011100" would also be de-installed automatically for classification family 0.

Referring to FIG. 7, the processing steps taken by the centralized packet classifier to install a general reference pattern are explained in detail. A general reference pattern is one that contains at least one wildcard as explained previously. A driver or other client installing a general reference pattern will present the general reference pattern, a classification family associated with the general reference pattern, the classification information, and a priority to be used in resolving partial overlap conditions to the centralized packet classifier.

After beginning at step 168, the new general reference pattern will be installed in the general database pertaining to the particular classification family at step 170. Also, a pointer is set to point to the indicated classification information. At step 172, a search is made into the specific database for an existing specific reference pattern entry that matches the new general pattern. If a specific reference pattern already exists that matches this general reference pattern, links may be made in the specific database to the classification information associated with the installed general reference pattern. This increases search efficiency that thereby reduces total classification time. The general reference pattern can be expanded into a set of specific reference patterns, and the purpose of searching the specific database is to find all the currently installed specific reference patterns that would match the general reference pattern to be installed.

If there are no more matching specific reference patterns in the specific database that can be matched to the newly installed general reference pattern as determined at step 174, processing ends at step 176 for the installation of the new general reference pattern. Otherwise, the matched specific reference pattern is used to access the corresponding classification block that will contain a pointer for each classification family defined to the system.

At step 178, a determination is made whether the pointer in the classification block for the classification family of the newly installed general reference pattern currently points to any classification information. If the corresponding pointer in the classification block as determined at step 178 is null or otherwise does not have classification information associated therewith, the pointer is set to point to the classification information associated with the newly installed general reference pattern at step 180. This provides an efficiency in that the classification information may more quickly be accessed by a search to the specific database before an actual search of the general database. Next, the loop is iterated with a search for the next match to the general reference pattern found in the specific pattern database at step 182.

If the pointer in the classification block corresponding to the classification family of the general reference pattern being installed is already pointing to classification information or otherwise assigned as determined at step 178, a determination is made at step 184 as to whether the classification information was explicitly assigned or automatically assigned to the particular reference pattern. An explicit assignment occurs when the specific reference pattern was independently installed into the specific database rather than automatically installed during the installation of the specific reference pattern for another classification family or the installation of a general pattern. In other words, an automatic installation may occur as a performance enhancement that is a byproduct of another independent reference pattern installation.

If the classification information was explicitly assigned as determined in step 184, then no further action need be taken and the processing proceeds to search for the next match in the specific database that matches the general reference pattern at step 182. An explicit assignment will naturally take precedence over a performance enhancing automatic assignment.

If the classification information was not explicitly not assigned as determined at step 184, then the classification information associated with the best match, if any, found in the general database for the particular classification family is assigned to the specific reference pattern, for that classification family. This occurs at step 186, where the general database is searched in order to find the best match to this specific reference pattern. Note that the installation of the new general reference pattern may or may not change the best match for the specific reference pattern that will result. In other words, the existing non-explicitly assigned classification information may already be the best match due to the fact that a more specific overlapping general reference pattern exists or a higher priority partial overlapping general reference pattern exists.

With the results of the search made at step 186, the pointer in the classification block for the specific reference pattern corresponding to the classification family for the newly installed general reference pattern is set to point to the classification information indicated by the search at step 188.

At this point, the next match in the specific database for the pattern matching the new general reference pattern is taken at step 182 for processing. Again, as explained previously, when no other matching specific reference pattern can be found as determined at step 174, processing ends at step 176.

Another performance benefit that may be implemented in some embodiments is automatic expansion of the general reference pattern into a corresponding set of specific reference patterns. This set of specific reference patterns can then be installed into the specific database so that every match to the general reference pattern can be made in the constant search time specific database. This may be practical with general reference patterns with a relatively few number of wildcards found therein and may be too inefficient for general reference patterns that are expanded into large sets of specific reference patterns. Those skilled in the art will note that the auto-expansion described above and other performance enhancing modifications may be made to the present invention in order to better classification efficiency.

In order to illustrate the installation of a new general reference pattern an example installation of the pattern "01X100" for classification family 0 associated with classification information 0c 190 and having a priority of 0 will be installed. Once the installation is completed, the logical diagram of the example classification system of FIG. 6 will appear as shown in FIG. 8.

Figure 8:
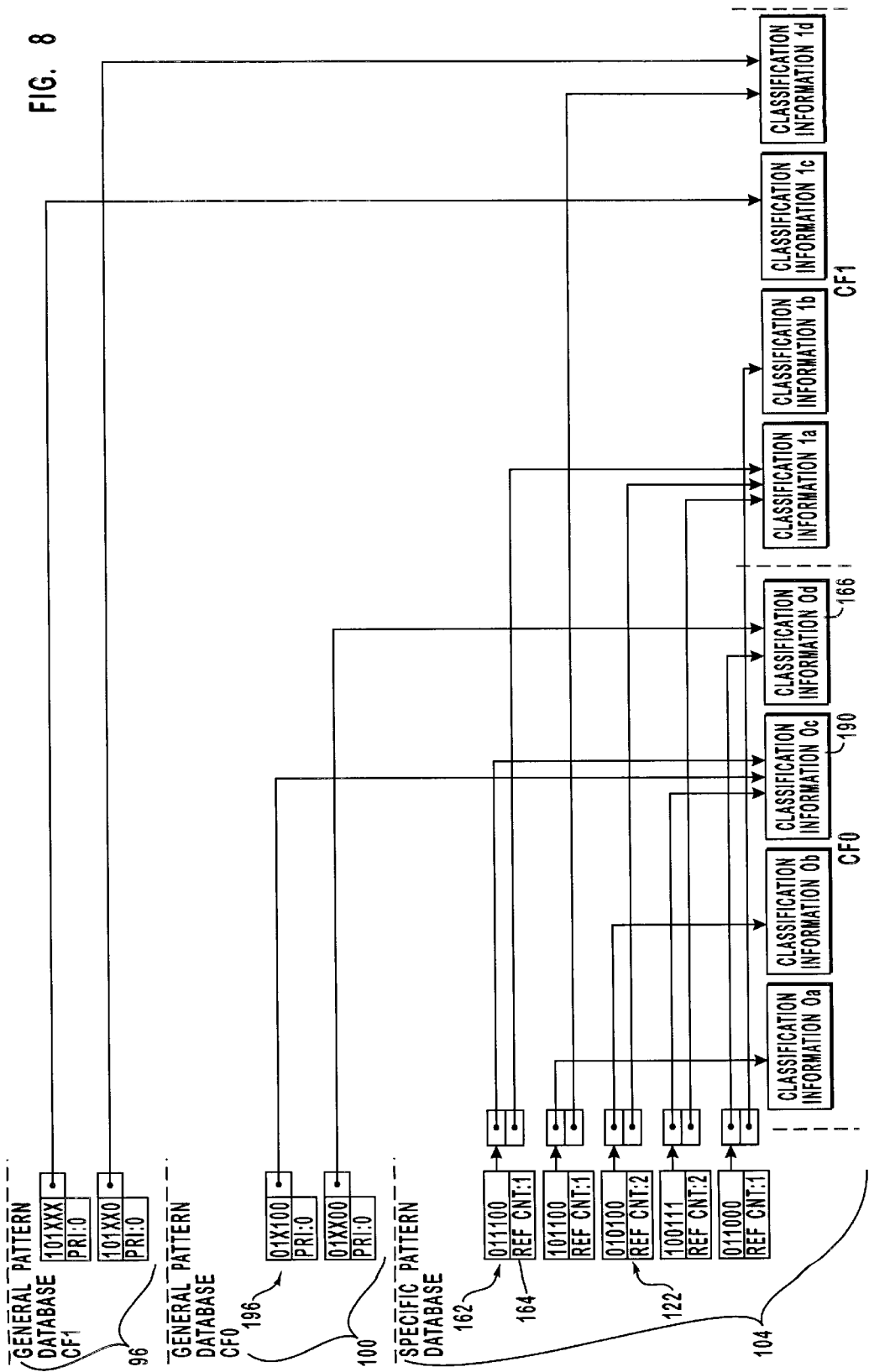
FIG. 8 is a logical diagram showing the database organization and example of FIG. 6 after the installation of a new general reference pattern according to the processing steps explained in the flow chart of FIG. 7.

Initially, the new general reference pattern is installed at step 170 as entry 196 in FIG. 8 with the pointer pointing to the classification information 0c 190. As part of the processing, two specific reference patterns will be found in the specific database 104, namely, the pattern "011100" represented by entry 162 and pattern "010100" as represented by entry 122. Note that entry 122 was explicitly installed previously for classification family 0 and points to classification information 0b 195 while entry 162 initially points to classification information 0d 166 as a result of an implicit installation as can be seen in FIG. 6. For each of these two patterns, the pointer in the classification block indicated by the classification family will already be assigned as determined at step 178 (FIG. 7). Therefore, processing of step 180 will not be taken.

With reference to the determination of whether or not the classification information was explicitly assigned at step 184, entry 122 corresponding to the reference pattern "010100" was explicitly assigned. Therefore, entry 122 will not be changed in any manner by the addition of the new general reference pattern.

This is not the case, however, with entry 162, which for classification family 0 was automatically assigned as part of the installation of the specific reference pattern "011100" for classification family 1 explained previously. Therefore, processing steps 186 and 188 are followed in order to automatically re-assign the classification information corresponding to the best match found in the general reference database for this specific reference pattern.

By searching the general pattern database 100 for classification family 0 using the specific reference pattern "011100," the general reference pattern that was newly added indicated by entry 196 (FIG. 8) will be the best match since it is the most specific match. Therefore, the pointer in the classification block corresponding to entry 162 for the classification family 0 will no longer point to classification information 0d 166, but be changed to point to classification information 0c 190 as shown in FIG. 8.

Figure 9:
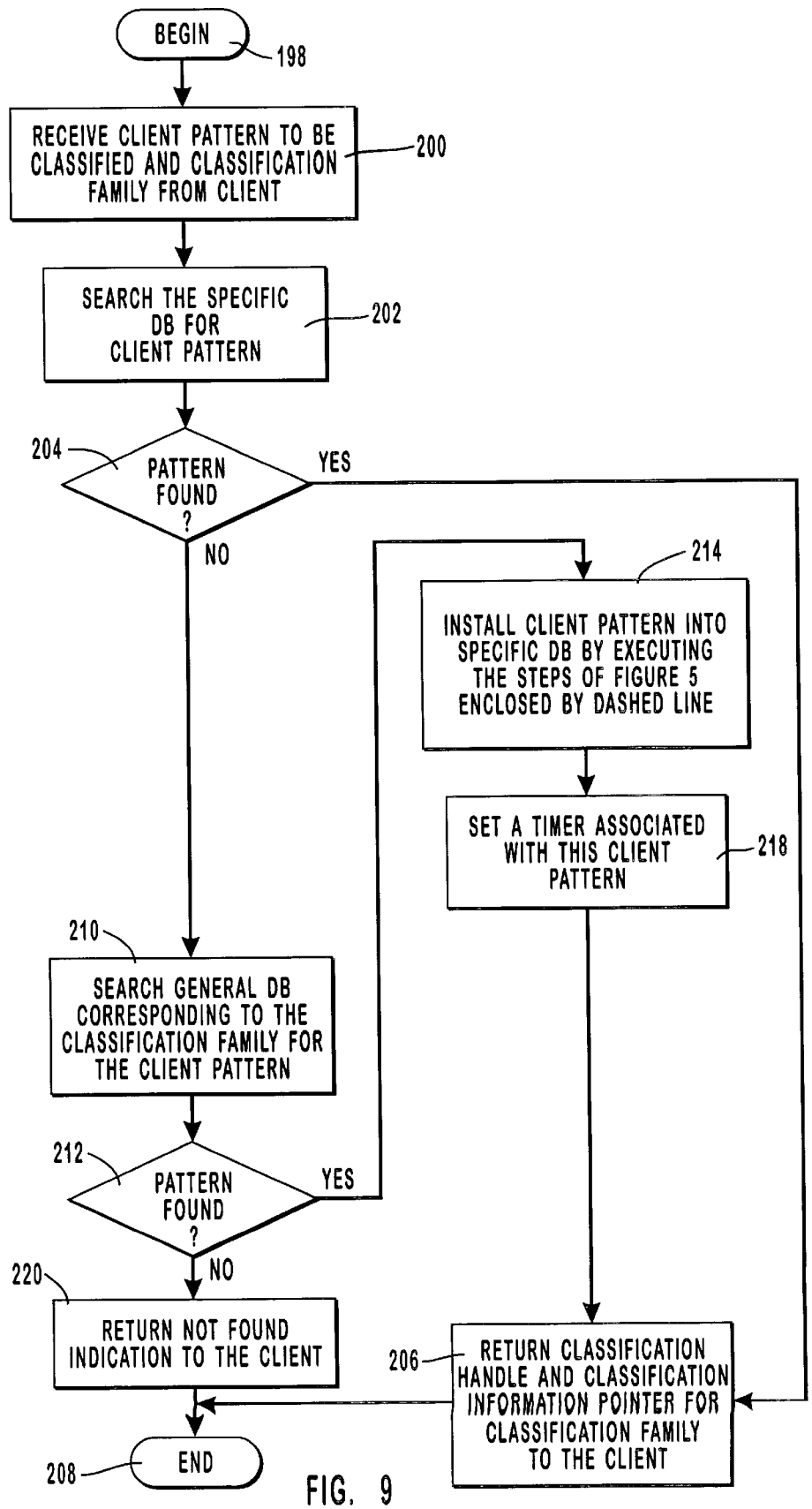
FIG. 9 is a flow chart illustrating the processing steps necessary for classifying a packet by receiving a classification pattern and comparing it to reference patterns in, first, the specific database, and, second, the general database for the particularly classification family. Furthermore, the steps for temporarily installing a client classification pattern into the specific database for increased efficiency are shown.

Referring now to FIG. 9, a flow chart showing the processing steps taken in order to perform a classification on a classification pattern received from a driver or other client is explained. The driver or other client will create a classification pattern by taking values from the packet to be classified and concatenating them together in the proper order. After beginning at step 198, the classification pattern created by the client or client pattern along with the client's classification family is received by the centralized packet classifier at step 200.

Initially, a search is made for the client classification pattern at step 202 in the specific database. If an entry is found in the specific database corresponding to the client classification pattern, the associated classification block can be accessed and the client's classification family is used to access the appropriate pointer in the classification block. If the pointer in the classification block corresponding to the classification family is non-null, then the classification pattern is considered found at step 204. If either the entry does not exist for the client classification pattern or the entry exists but the pointer is null for the client's classification family, the pattern is considered not found at step 204.

Should the pattern be found at step 204, a pointer to the classification information as well as a handle to the classification block are returned to the client at step 206 before ending processing at step 208. The pointer to the appropriate classification information can be used in processing the now classified packet by the driver or other client. The classification handle is useful in later processing by other drivers that may need to perform classification that may belong to different classification families. In other words, a driver may pass the classification handle to other drivers and by using the classification handle, the other drivers or the current driver may more quickly and efficiently perform a classification using the centralized packet classifier without making any searches to either the specific database or a general database. The classification handle is a more reliable way of getting to the actual classification information than a pointer to the information itself since the classification information and hence the pointers may change during installation and de-installation of reference patterns or other centralized packet classifier operation such as the expiration of automatically installed reference patterns.

If a pattern is not found as determined at step 204, the general database corresponding to, the classification family for the client classification pattern is searched in order to find an existing general reference pattern that matches the client classification pattern at step 210. If a match to the client pattern is found as determined at step 212, the client pattern is installed into the specific database at step 214 using the steps of the flow chart shown in FIG. 5 encircled by dashed line 216. The operation of these steps was explained previously. Note that all other general databases for the other classification families will be searched as well in order to fully optimize the installation.

Next, a timer is set associated with this automatically installed client classification pattern at step 218 that will allow the pattern to remain installed as a specific reference pattern in the specific database for a certain period of time. When the timer expires, the specific reference pattern will be de-installed in an automatic fashion. The reason for a temporary installation, is that in many instances, a given client classification pattern will be used multiple times by the current driver and other drivers in the network stack. By having the classification pattern already installed in the specific database for other classification attempts, future classification attempts can be made more efficiently by the centralized packet classifier.

Once the classification block has been set by the installation of the client pattern at step 214 and the timer set at step 218, the classification handle and classification information pointers are returned to the client at step 206 before processing ends at step 208. Note that, as far as the driver or other client is concerned, it cannot perceive the difference of a classification information pointer and classification block handle retrieved from either a specific database or a general database.

If the client classification pattern is not found in the general database as determined at step 212, an indication will be returned to the client at step 220 that the classification failed since a matching pattern could not be found in either the specific database or general database for that particular classification family. Finally, processing ends at step 208.

Beginning with the logical diagram of FIG. 8 as a starting point, an example of searching for a non-existent pattern will be shown following the processing steps of FIG. 9. Specifically, a client classification pattern of "101111" for classification family 1 is presented to the centralized packet classifier. After searching the specific database in step 202 (FIG. 9) the pattern will not be found. A search of the general database corresponding to the client's classification family will then be made at step 210. The client pattern will match the general pattern "101XXX" in the general database 96 for classification family 0. At step 214, the client pattern will be installed into the specific database. As part of the installation at step 214, which in turn follows the processing steps of FIG. 5 encircled by dashed line 216, a match to the general pattern database for classification family 1 during the search performed at step 148 or 156 (FIG. 5) will cause the pointer in the classification block for classification family 1 to point to the corresponding classification information. Since the client classification pattern was not found for classification family 0 in the corresponding general database during the installation, the classification block for the newly installed timed specific database entry remains null for classification family 0. Note that as part of the installation at step 214, a test is made for matching general patterns in other classification families.

Next, a timer is set for the entry at step 218 before the classification handle and pointer to the classification information is returned to the client at step 206. Note that the same information is returned to the client regardless of whether the pattern was found in the specific database or the general database.

Figure 10:
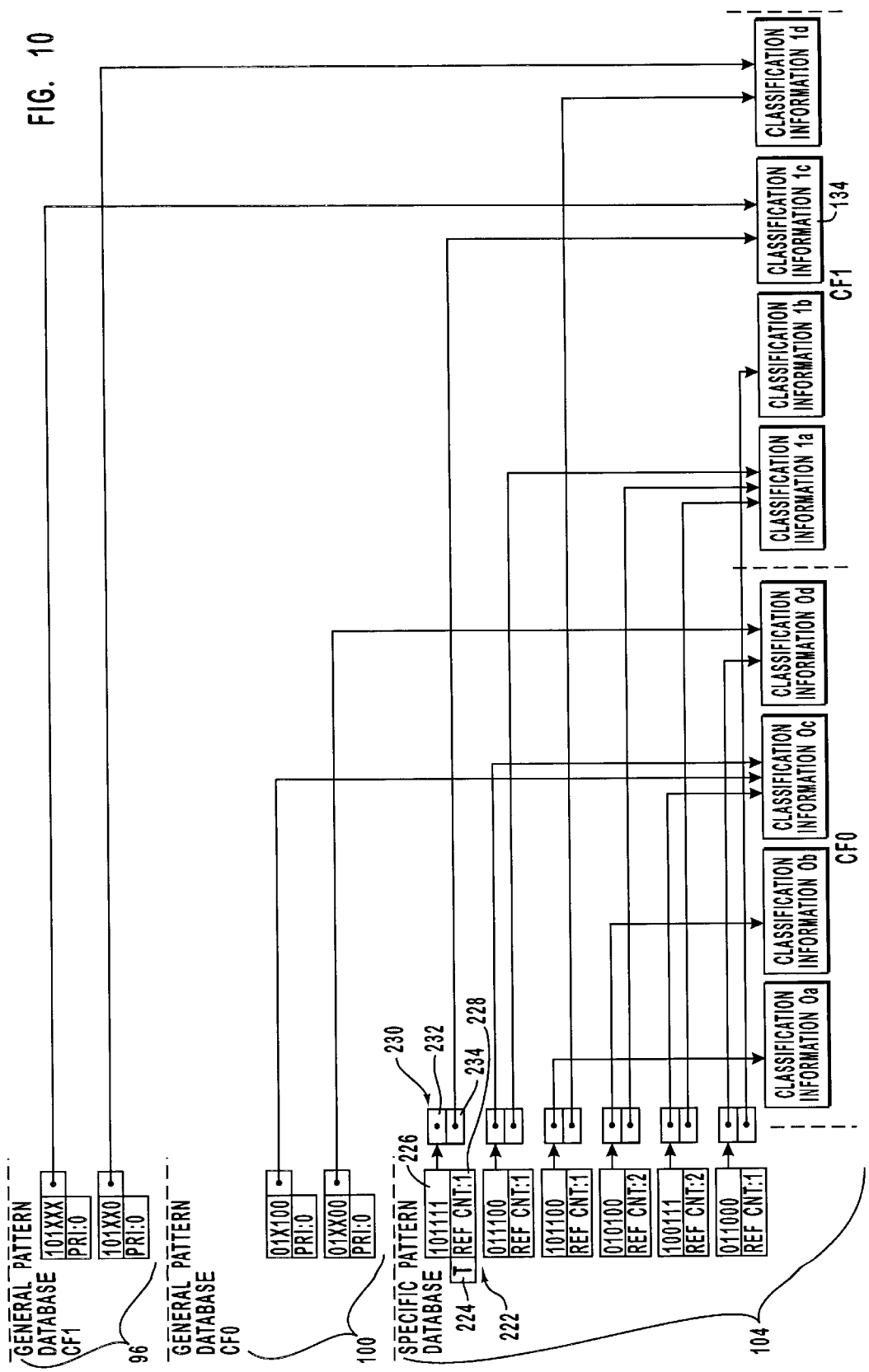
FIG. 10 is a logical diagram showing the database organization and example of FIG. 8 after the addition of a temporarily installed specific pattern according to processing steps explained in the flow chart of FIG. 9.

Referring now to FIG. 10, a logical diagram of a classification system like that of FIG. 8 is shown with the addition of the added specific reference pattern due to a classification request initiated by a driver or other client. The new entry 222 has a timer 224 associated therewith. Besides a pattern value 226 of "101111," the reference count value 228 is initially set to 1. Since the specific reference pattern for classification family 0 was not found, the pointer 232 for the reference block 230 is null while the pointer 234 points to classification information 1c 134.

Figure 11:
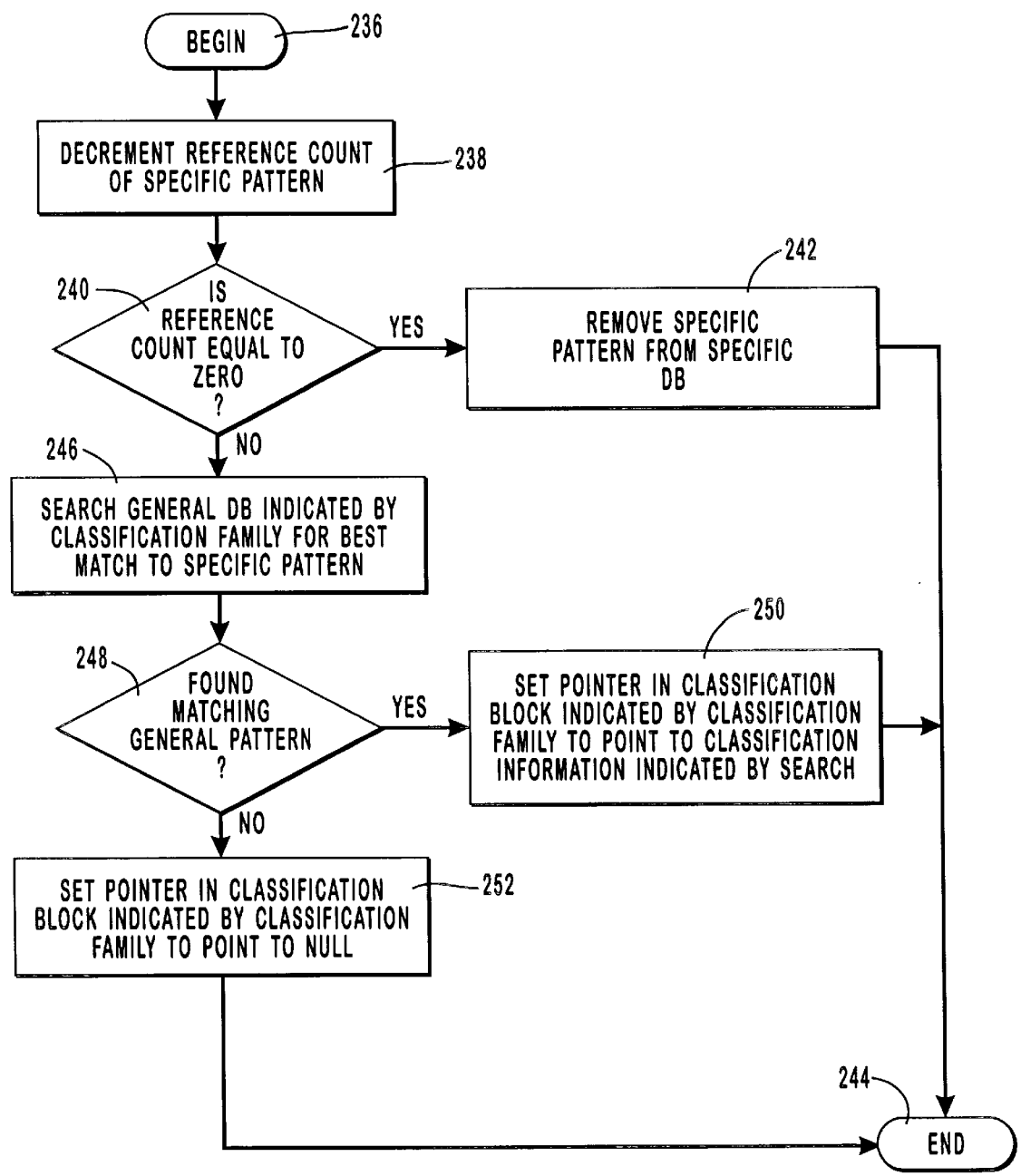
FIG. 11 is a flow chart illustrating the processing steps necessary for removing a specific pattern from the specific database.

Referring now to FIG. 11, the processing steps taken by the centralized packet classifier for the de-installation of a specific reference pattern are shown. After beginning at step 236, the reference count field value for the entry in the specific database for the particular specific reference pattern is decremented by one at step 238. At step 240, a determination is made whether the value of the reference count field is equal to zero and if so, the specific reference pattern entry is completely removed from the specific database at step 242 before ending processing at step 244. Essentially,. a reference count field value of zero indicates that this specific pattern is not explicitly installed for any classification family and therefore it should be removed.

If the reference count field value is not equal to zero as determined in step 240, a search is made into the general database for the classification family indicated in the de-install operation for the best match to the specific reference pattern at step 246. Even though a specific reference pattern is de-installed for a particular classification family, there may yet be a match in the general pattern database for that specific reference pattern. If so, than an efficiency is gained by placing a pointer to the relevant classification information and to the appropriate location in the classification block.

If a matching general reference pattern is found at step 248, then the pointer in the classification block indicated by the classification family is set to point to the classification information found during the general database search performed at step 246. The setting of the pointer occurs at step 250 before processing ends at step 244.

If no matching general reference pattern is found as determined in step 248, the pointer in the classification block indicated by the classification family is set to null at step 252 before ending at step 244. In that case, there truly is no classification information available for that specific reference pattern and classification family.

Figure 12:
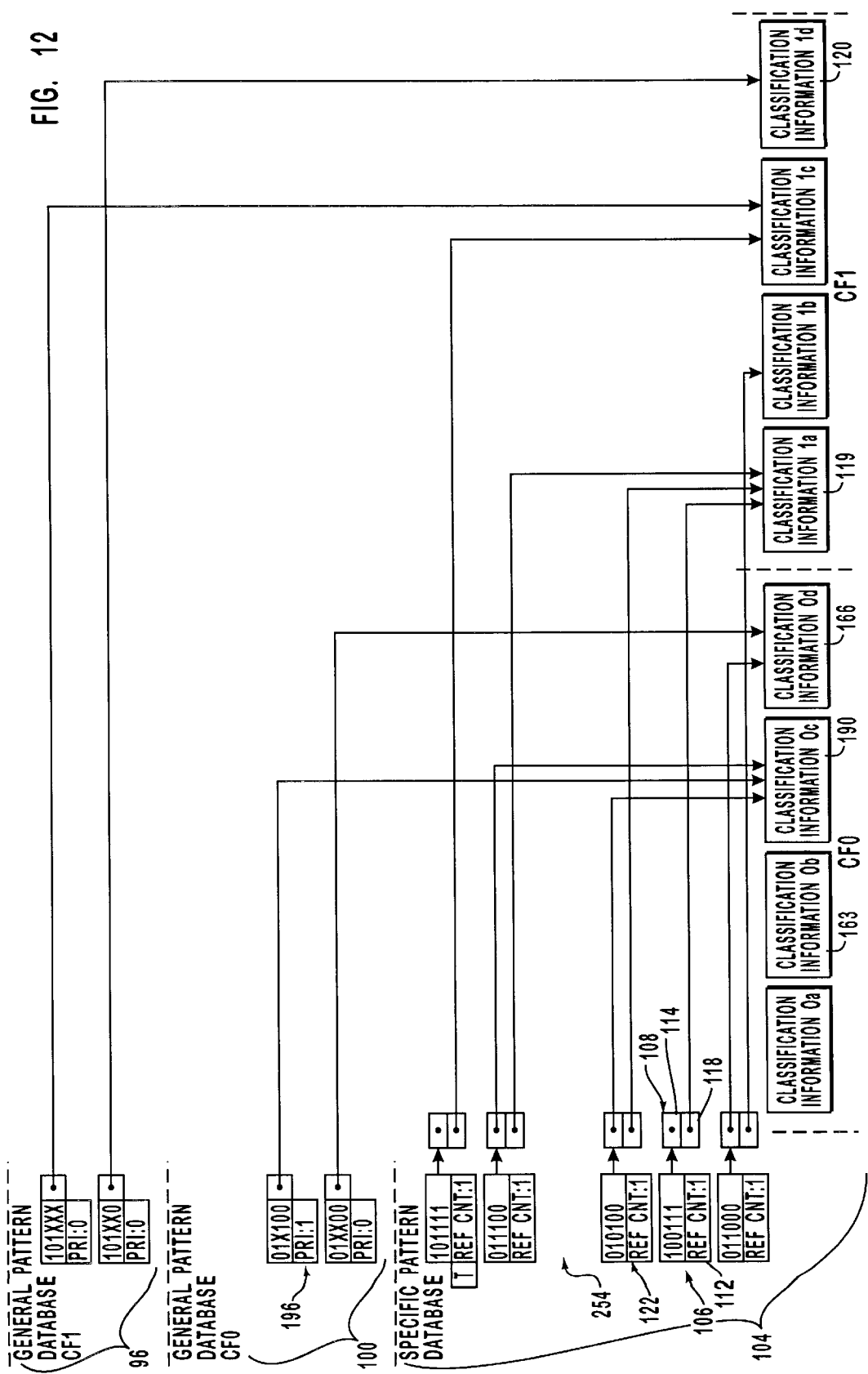
FIG. 12 is a logical diagram showing the database organization and example of FIG. 10 after the removal of a number of specific reference patterns according to the processing strips explained in the flow chart of FIG. 11.

Referring now to FIG. 12, a logical diagram of the configuration system shown in FIG. 10 is shown after the removal of three specific reference patterns according to the processing steps explained in FIG. 11. Namely, the specific reference pattern "010100" was removed for classification family 0 causing the corresponding pointer to change the indicated classification information, the specific reference pattern "101100" was removed for classification family 0 causing the pattern to be removed entirely from the database, and the specific reference pattern "100111" was removed for classification family 0 causing the corresponding pointer to be set to null.

When removing the specific reference pattern "101100" for classification family 0, the reference count will eventually equal zero as determined at step 240 of FIG. 11 such that the entire specific pattern is removed from the specific pattern database 104 as seen by the arrow 254 pointing to the missing entry that existed previously as shown if FIG. 10. Note that the implicit installation of the specific reference pattern "101100" for classification family 1 would also be removed. Any effort by a client to classify the specific reference pattern for classification family 1 would result in an automatic installation with a timer as explained previously.

With respect to the removal or de-installation of the specific reference pattern "100111" classification family 0, the entry 106 in the specific pattern database 104 will show a reference count field 112 value of one due to decrementing the specific pattern reference count field 112 value at step 238 of FIG. 11. Also, since no match was found in the general pattern database for classification family 0 as determined in step 248, the pointer 114 of the classification block 108 corresponding to classification family 0 was set to null at step 252 (FIG. 11). Note that the pointer 118 of the classification block 108 still indicates classification information 1a 119 of classification family 1.

With respect to the de-installation of the specific reference pattern "010100" for classification family 0, entry 122 of FIG. 12 applies. After decrementing the reference count field at step 238 and performing the general database search at step 246 of FIG. 11, and upon finding a matching general reference pattern at step 248 in the general database, the pointer then points to classification information 0c 190. This occurs since a match was found to the general reference pattern "01X100" as found by entry 196 in the general pattern database 100 for classification family 0. In other words, the pointer for the classification block associated with entry 122 in classification family 0 switches from pointing from classification information 0b 163 to classification information 0c 190.

Figure 13:
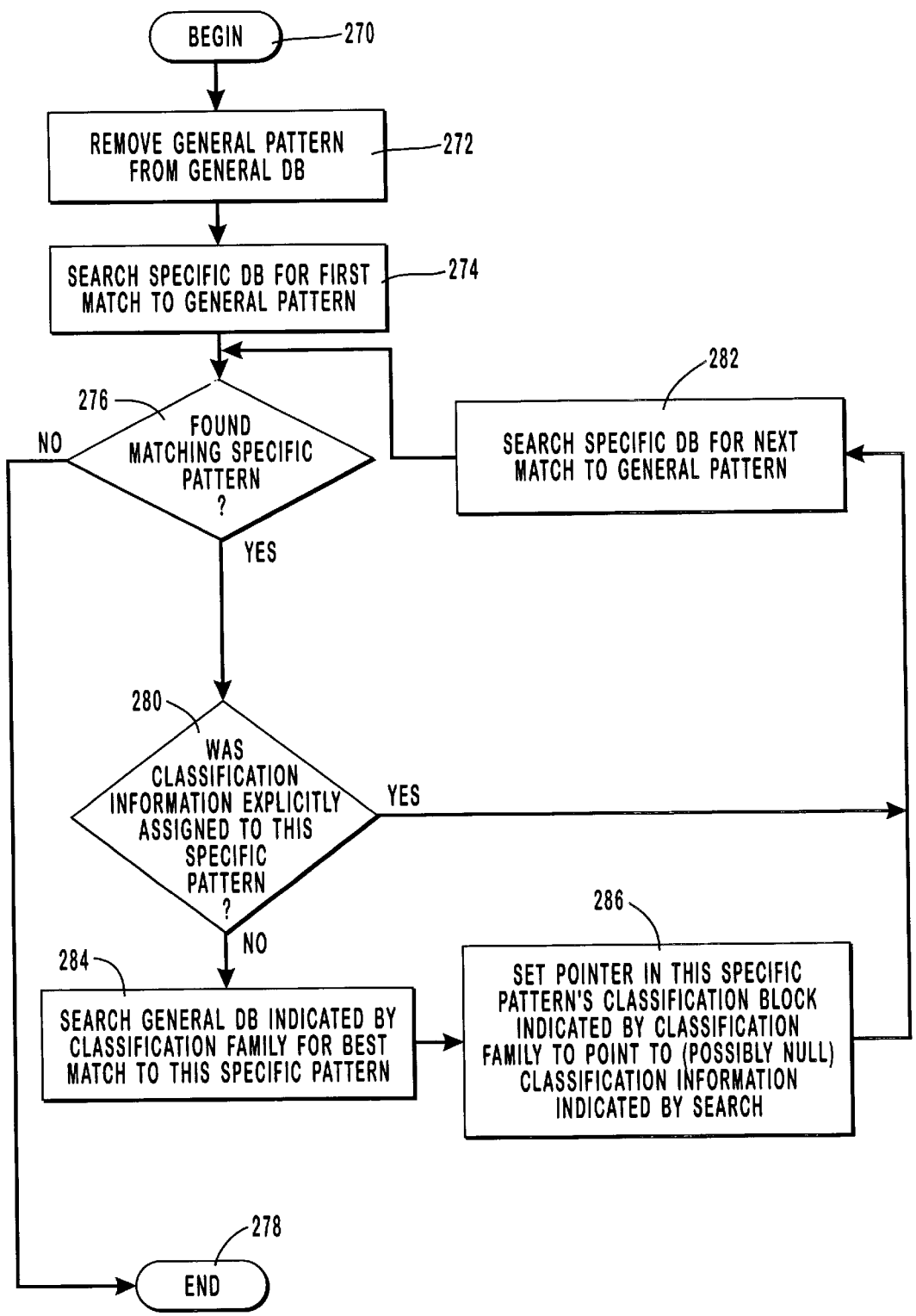
FIG. 13 is a flow chart illustrating the processing steps necessary for removing a general reference pattern from a general database for a particular classification family.

Referring now to FIG. 13, the processing steps taken for removing a general reference pattern from a general database are explained in detail. After beginning at step 270, the general reference pattern is removed entirely from the general database along with any pertaining classification information associated therewith.

Next the specific database is searched for all specific reference patterns that match the set of specific patterns corresponding to the general reference pattern. At step 274, the specific database is searched for the first match to the general reference pattern. If it is determined at step 276 that no more matching specific reference patterns can be found, then processing ends at step 278. Otherwise, the main body of the flow chart continues until all matching specific patterns have been found and processed.

Upon finding a matching specific reference pattern as determined in step 276, a determination is made at step 280 whether or not the classification information for the particular classification family was explicitly assigned to this specific reference pattern. If so, then no new processing is necessary since the specific reference pattern was designed to be more specific and was not automatically assigned in some fashion. Therefore, at step 282 the specific database is searched for the next match to the general reference pattern and the loop iterates.

If the classification information was not explicitly assigned as determined in step 280, then the general database is searched for the best match to this particular specific pattern and classification family at step 284. The results of such search will either indicate null if no best match was found or will indicate the classification information associated with that best match. At step 286, the entry's classification block pointer indicated by the classification family is set to point to the classification information resulting from the search done in step 284. Essentially, an automatically installed specific reference pattern will be reinstalled and automatically get the best match from the general database for the particular classification family. In some instances the pointer in the classification block will change and in others it will not.

Figure 14:
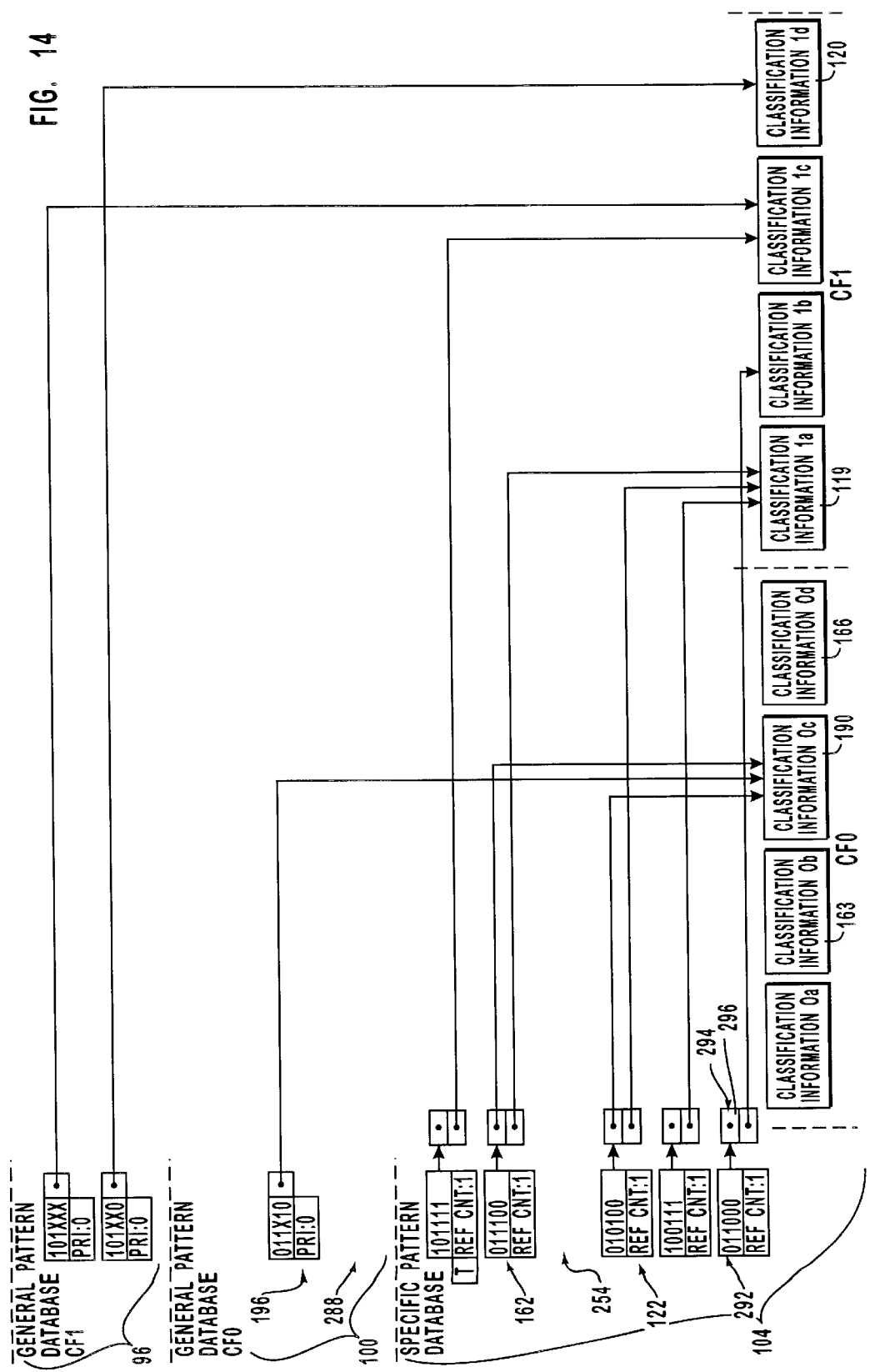
FIG. 14 is a logical diagram showing the database organization and example of FIG. 12 after the removal of a number of general reference patterns according to the processing strips explained in the flow chart of FIG. 13.

Referring now to FIG. 14, a logical diagram representing the example classification system of FIG. 12 is shown after a general reference pattern has been removed. Specifically, the general reference pattern "01XX00" for classification family 0 having a priority of 0 has been removed according to the processing steps explained in the flow chart of FIG. 13. This is shown in FIG. 14 by the arrow 288 indicating the missing entry for that general reference pattern.

After removal of the general reference pattern from the general database at step 274 of FIG. 13, three matching specific patterns are found in the specific pattern database that correspond to the recently removed general reference pattern ("01XX00"). Namely, entry 162 for specific reference pattern "011100," entry 122 for specific reference pattern "010100" and entry 292 for specific reference pattern "011000." With respect to entry 122 and entry 162, the classification information was implicitly assigned as a result of the explicit installation of the patterns for classification family 1. Adjustment may therefore be necessary so the general database for classification family 0 was searched again in each case and the pointers reassigned with the same classification information since no better matches were found.

With respect to entry 292, the classification information was implicitly assigned to the specific reference pattern for classification family 0. Therefore after such determination is made at step 280, the general database for classification family 0 was searched again at step 284 using the specific reference pattern of entry 292. The results of this search indicate that no other general reference pattern exists that matches the specific reference pattern "011000." In step 286, the classification block 294 associated with entry 292 having pointer 296 is adjusted so that pointer 296 is now null. In this manner, the automatically generated specific pattern database 104 references to classification information are reconciled due to the removal of the general pattern database 102 for classification family 0.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for classifying network communication packets processed in a network stack by a plurality of drivers comprising the steps of:

storing, in a shared reference pattern database shared by multiple drivers, at least one reference pattern and corresponding classification information, the shared reference pattern database containing a specific database for all specific reference patterns regardless of classification family and, for each classification family, a general database for general reference patterns pertaining to that classification family;

searching the shared reference pattern database for a reference pattern that matches a classification pattern created from a network communication packet by searching first the specific database for the classification pattern followed, if necessary, by searching the general database pertaining to the classification family for the classification pattern; and if the classification pattern matches a stored reference pattern, processing the network communication packet using the classification information corresponding to the matched reference pattern.

2. A method as recited in claim 1 wherein the specific database comprises a classification block structure that has references to different classification information for a given specific pattern depending on classification family and the storing step for a specific reference pattern stored for one classification family further comprises the steps of:

searching the general databases for each other classification family for a general reference pattern that matches the specific reference pattern stored; and for each match, making a reference in the classification block for the particular classification family that references the classification information of the matched general reference pattern so that future classification patterns presented that match the specific reference pattern in other classification families will match in the specific database search without resorting to the general database thereby increasing search efficiency.

3. A method as recited in claim 1 wherein the specific database comprises a classification block structure that has references to different classification information for a given specific pattern depending on classification family and the storing step for a specific reference pattern stored for one classification family further comprises the steps of:

searching the specific database for each existing specific pattern matches the general reference pattern installed; and for each match, if the reference for the particular classification family corresponding to the new general reference pattern installed is null, making a reference in the classification block for the particular classification family that references the classification information of the installed general reference pattern so that future classification patterns presented that match the specific reference pattern in the classification family will match in the specific database search without resorting to the general database thereby increasing search efficiency.

4. A method as recited in claim 1 wherein the specific database comprises a classification block structure that has references to different classification information for a given specific pattern depending on classification family and the storing step for a specific reference pattern stored for one classification family further comprises the steps of:

searching the specific database for each existing specific pattern matches the general reference pattern installed; and for each match having a reference for the particular classification family corresponding to the new general reference pattern in the classification block structure, searching the general database of the classification family for the installed general reference pattern for the best general reference pattern matching this specific pattern and making a reference in the classification block for the particular classification family that references the classification information of the best matched general reference pattern so that future classification patterns presented that match the specific reference pattern in the classification family will match in the specific database search without resorting to the general database thereby increasing search efficiency.

5. A method as recited in claim 1 wherein the storing step for a general reference pattern further comprises the steps of:

generating the entire set of specific reference patterns corresponding to the general reference pattern; and storing each specific reference pattern of the set of specific reference patterns into the specific database referencing the classification information provided with the general reference pattern.

6. A method as recited in claim 1 wherein each classification pattern searched is automatically stored as a specific pattern in the specific database in order to increase classification efficiency.

7. A method as recited in claim 1 wherein each classification pattern searched is automatically stored as a specific pattern in the specific database and further removed after a period of time has passed with no classifications made thereto in order to increase future classification efficiency.

8. A method for classifying packets processed in a network stack comprising the steps of;

installing, by a software component, at least one reference pattern and associated classification information into a means for packet classification containing a common database for storing reference patterns and corresponding classification information;

presenting, to the means for packet classification, a classification pattern from a packet to be classified by at least one portion of code outside the means for classification through a pre-defined interface, and wherein the at least one portion of code presenting the classification pattern through the predefined interface is either (a) a separate software component from the means for packet classification such that multiple software components may access the means for packet classification through the predefined interface, or (b) a software driver such that multiple software drivers may access the means for packet classification through the predefined interface; and if the classification pattern matches an installed reference pattern, returning, to the at least one portion of code by the means for classification, access to the classification information associated with the reference pattern so that the packet may be processed using the classification information.

9. A method as recited in claim 8 wherein access is given by returning a pointer to the classification information corresponding to the matched reference pattern.

10. A method as recited in claim 8 further comprising a classification family and wherein the at least one portion of code outside the means for classification comprises at least two separate portions of code that share a classification family.

11. A method as recited in claim 8 wherein the means for packet classification comprises a database for storing the installed reference patterns and a match is determined by searching the database for the classification pattern.

12. A method as recited in claim 8 wherein the installed reference patterns are either general or specific reference patterns and pertain to a classification family, the means for packet classification comprises a specific database for all specific reference patterns regardless of classification family and, for each classification family, a general database for general reference patterns pertaining to that classification family, and matching a classification pattern to an installed reference pattern comprises searching first the specific database for the classification pattern followed, if necessary, by searching the general database pertaining to the classification family for the classification pattern thereby increasing matching efficiency.

13. A method as recited in claim 12 wherein the specific database comprises a classification block structure that has references to different classification information for a given specific pattern depending on classification family and the installing step for a specific reference pattern installed for one classification family further comprises the steps of:

searching the general databases for each other classification family for a general reference pattern that matches the specific reference pattern installed; and for each match, making a reference in the classification block for the particular classification family that references the classification information of the matched general reference pattern so that future classification patterns presented that match the specific reference pattern in other classification families will match in the specific database search without resorting to the general database thereby increasing search efficiency.

14. A method as recited in claim 12 wherein the specific database comprises a classification block structure that has references to different classification information for a given specific pattern depending on classification family and the installing step for a general reference pattern installed for one classification family further comprises the steps of:

searching the specific database for each existing specific pattern matches the general reference pattern installed; and for each match, if the reference for the particular classification family corresponding to the new general reference pattern installed is null, making a reference in the classification block for the particular classification family that references the classification information of the installed general reference pattern so that future classification patterns presented that match the specific reference pattern in the classification family will match in the specific database search without resorting to the general database thereby increasing search efficiency.

15. A method as recited in claim 12 wherein the specific database comprises a classification block structure that has references to different classification information for a given specific pattern depending on classification family and the installing step for a general reference pattern installed for one classification family further comprises the steps of:

searching the specific database for each existing specific pattern matches the general reference pattern installed; and for each match having a reference for the particular classification family corresponding to the new general reference pattern in the classification block structure, searching the general database of the classification family for the installed general reference pattern for the best general reference pattern matching this specific pattern and making a reference in the classification block for the particular classification family that references the classification information of the best matched general reference pattern so that future classification patterns presented that match the specific reference pattern in the classification family will match in the specific database search without resorting to the general database thereby increasing search efficiency.

16. A method as recited in claim 12 wherein the installing step for a general reference pattern further comprises the steps of:

generating the entire set of specific reference patterns corresponding to the general reference pattern; and installing each specific reference pattern of the set of specific reference patterns into the specific database referencing the classification information provided with the general reference pattern.

17. A method as recited in claim 12 wherein each classification pattern presented to the means for packet classification is automatically installed as a specific pattern into the specific database.

18. A method as recited in claim 12 wherein each classification pattern presented to the means for packet classification is automatically installed as a specific pattern into the specific database and further de-installed after a period of time has passed with no classifications made thereto.

19. A method for classifying packets processed in a network stack comprising the steps of:

installing, by a software component, at least one reference pattern and associated classification information organized into a means for packet classification, the at least one reference pattern and associated classification information organized into classification families and the means for packet classification containing:

a database for each classification family for storing general reference patterns and corresponding classification information; and a common constant time database for storing specific reference patterns and corresponding classification information regardless of classification family;

presenting, to the means for classification, a classification pattern from a packet to be classified by a driver through a pre-defined interface; and if the classification pattern matches an installed reference pattern, returning, to the driver, access to the classification information associated with the reference pattern so that the packet may be processed using the classification information.

20. A computer-readable medium having computer-executable program code means embodied in said medium for classifying packets processed in a network stack based on a classification pattern from a particular packet, said computer readable program code means comprising:

an interface means for interfacing with other portions of code and receiving requests for installation of a reference pattern and a corresponding classification information in a classification family, receiving requests for classification of a classification pattern from a packet to be classified, and returning an access means to classification information;

a general database means for storing general reference patterns and associated classification information upon receipt by the interface means of an installation request for each classification family;

a constant search time database means for storing specific reference patterns and associated classification information upon receipt by the interface means of an installation request without regard to classification family; and a matching means for comparing a classification pattern received by the interface means to the reference patterns stored in both database means based on a classification request, and if a matching reference pattern is found, returning access to the classification information corresponding to the matched reference pattern through the interface means to allow the packet to be processed using the classification information.

* * * * *

UNITED STATES PATENT AND TRADEMARK OFFICE
CERTIFICATE OF CORRECTION

PATENT NO. : 5,956,721
DATED : September 21, 1999
INVENTOR(S) : John R. Douceur, Yoram Bernet, Ofer Bar It is certified that error appears in the above-identified patent and that said Letters Patent is hereby corrected as shown below:

Col 1, ln. 37: after "concepts" and before "apply" insert --to--

Col. 5, ln. 21: after "arrive" and before "a particular" insert --at--

Col. 5, ln. 28: after "extra" change "lime" to --time--

Col. 5, ln. 57: after "that" and before "may" insert --it--

Col. 6, ln. 47: after "access" and before "the corresponding" insert --to--

Col. 8, ln. 2: before "classification" change "particularly" to --particular--

Col. 9, ln. 27: after "reference" change "Lo" to --to--

Col. 10, ln. 5: after "that" change "helps" to --help--

Col. 11, ln. 29: after "92" change "uses" to --use--

Col 12, ln. 15: after "information" and before "for" insert --98--

Col 13, ln. 35: after "reference" change "patterns" to --pattern--

UNITED STATES PATENT AND TRADEMARK OFFICE
CERTIFICATE OF CORRECTION

PATENT NO. : 5,956,721
DATED : September 21, 1999
INVENTOR(S) : John R. Douceur, Yoram Bernet, Ofer Bar It is certified that error appears in the above-identified patent and that said Letters Patent is hereby corrected as shown below:

Col. 15, ln. 67: after "FIG." change "1" to --11--

Col. 19, ln. 6: after "to" and before "the" delete [,]

Col. 21, ln. 6: after "shown" change "if" to --in--

Signed and Sealed this

Nineteenth Day of September, 2000

Attest:

Q. TODD DICKINSON

Attesting Officer

Director of Patents and Trademarks